United States Patent [19]

Croce et al.

[11] Patent Number: 4,950,704

[45] Date of Patent: Aug. 21, 1990

[54] IMPROVING STABILITY AT MODERATE TEMPERATURES OF MOTOR VEHICLE COMPONENTS SHAPED FROM POLYVINYL CHLORIDE RESIN COMPOSITIONS

[75] Inventors: Michael A. Croce, Brooklyn; Kook J. Bae, East Northport; Stuart D. Brilliant, Levittown, all of N.Y.

[73] Assignee: Argus Chemical Corporation, Oakland, N.J.

[21] Appl. No.: 353,567

[22] Filed: May 18, 1989

Related U.S. Application Data

[63] Continuation-in-part of Ser. No. 162,705, Mar. 1, 1988.

[51] Int. Cl.$^5$ .................................................. C08K 5/07
[52] U.S. Cl. ........................................ 524/357; 524/181; 524/182; 524/399; 524/567
[58] Field of Search ............... 524/357, 567, 181, 182, 524/399; 428/31

[56] References Cited

U.S. PATENT DOCUMENTS

| | | | |
|---|---|---|---|
| 2,669,548 | 2/1954 | Darby | 524/301 |
| 3,001,970 | 9/1961 | Ebel | 524/335 |
| 3,492,267 | 1/1980 | Wood | 524/357 |
| 3,493,536 | 2/1970 | Weisfeld | 524/357 |
| 3,501,370 | 3/1970 | Juredine | 428/319.7 |
| 3,600,266 | 8/1971 | Huntzinger | 428/319.7 |
| 4,102,839 | 7/1978 | Crochmore et al. | 524/357 |
| 4,116,907 | 9/1978 | Shiohara et al. | 524/357 |
| 4,123,399 | 10/1978 | Gay | 524/357 |
| 4,221,687 | 9/1980 | Minagawa et al. | 524/357 |
| 4,244,848 | 1/1981 | Minagawa et al. | 524/567 |
| 4,252,698 | 2/1981 | Ito et al. | 524/567 |
| 4,267,083 | 5/1981 | Torloting | 524/357 |
| 4,282,141 | 1/1984 | Minagawa et al. | 524/357 |
| 4,371,651 | 2/1983 | Leistner et al. | 524/357 |
| 4,427,816 | 1/1984 | Aoki et al. | 524/357 |
| 4,522,084 | 6/1985 | Takimoto et al. | 428/424.6 |
| 4,590,233 | 5/1986 | Erweid et al. | 524/357 |
| 4,751,261 | 6/1988 | Miyata et al. | 524/357 |

*Primary Examiner*—Veronica P. Hoke
*Attorney, Agent, or Firm*—Lockwood, Alex, FitzGibbon & Cummings

[57] ABSTRACT

Motor vehicle components are provided having an improved stability at moderate temperatures and shaped from polyvinyl chloride resin compositions, comprising a polyvinyl chloride resin, at least one heat stabilizer in a sufficient amount to impart heat processing stability, and a β-diketone in a sufficient amount to provide, after forming, stability at moderate temperatures not provided by any residual heat stabilizer, as well as polyvinyl chloride resin stabilizer compositions and polyvinyl chloride resin compositions containing such heat stabilizer compositions suitable for use in forming motor vehicle components, comprising at least one heat stabilizer and a β-diketone.

22 Claims, No Drawings

IMPROVING STABILITY AT MODERATE TEMPERATURES OF MOTOR VEHICLE COMPONENTS SHAPED FROM POLYVINYL CHLORIDE RESIN COMPOSITIONS

This application is a continuation-in-part of application Serial No. 162,705, filed March 1, 1988, now abandoned.

Polyvinyl chloride resins, properly formulated, can be processed by standard plastics processing techniques (including calendering, extrusion, injection and compression molding, blow molding, rotational molding, slush and dip molding, solution casting, electrostatic spray and fluidized bed coating), to form a wide variety of end products, including plastic sheeting, furniture for both indoor and outdoor use, house sidings and other building components, and motor vehicle components, such as dashboards, seat coverings, floor mats, door panels, arm and head rests, body side moldings, window trim moldings, seat corners and head liners, door and window knobs, and crash dashboards.

Compounding components such as plasticizers, stabilizers, lubricants, impact modifiers, processing aids, fillers, colorants, antistatic agents, tackifiers, flame retardants, fungicides, antiblocking agents, etc. make the processing into these various end use components feasible without noticeable deterioration of the polymer. In the absence of such components, the resin would degrade during heat processing, liberating hydrogen chloride, discolor and become brittle, and stick to the equipment.

This success in stabilizing the polymer during heat processing has only been achieved after many years of development of the heat stabilizing systems that are now widely accepted as conventional. However, as Norman L. Perry, Chapter 17, *Encyclopedia of PVC*, Volume 2, (Marcel Dekker, Inc. New York and Basel, 1977) has noted at page 873, satisfactory protection against discoloration under processing temperature conditions does not necessarily ensure protection against discoloration thereafter when exposed to moderately hot temperatures over a long period.

In fact, protection against discoloration at moderate temperatures over long periods is a particular problem with motor vehicle components. Depending upon their location in the vehicle, they may be exposed to varying amounts of light, and also different rather high (above atmospheric) temperatures in use, and these differences can degrade motor vehicle components at differing rates. While normally it can be expected that the heat stabilizer systems capable of protecting the resin against degradation and discoloration during heat processing will not be completely consumed during such processing, and can be expected to contribute to stabilization following the processing, in fact the available heat stabilizers normally used are not sufficiently effective to prevent discoloration of motor vehicle components arising from exposure to moderate temperatures in use. It is a problem that, failing a solution, the automobile industry has had to live with.

Struber *Theory and Practice of Vinyl Compounding* (a publication of Argus Chemical Corporation, 1968) recommends specific heat stabilizer systems for use in automotive upholstery and flooring compounds, to provide moderate temperature aging stability in use. The organotin compounds, both mercaptides and maleate types, are effective, but relatively expensive, and also usually impart an objectionable odor that precludes their use.

Some barium/cadmium fatty acid salt stabilizers with high cadmium content are also effective. Struber notes that generally those compounds which tend to discolor most rapidly under moderate temperature conditions have received the greatest exposure to high temperature processing, making it quite clear that reliance is being placed on the residual amounts of heat stabilizers that are present in the composition after heat processing. The higher temperature heat processing conditions evidently have consumed a larger proportion of such stabilizers, accounting for their lesser stability and shorter life in use. However, simply increasing the amounts of heat stabilizers employed, even of the recommended types, has not been successful in resolving the moderate temperature ageing stability problem, particularly in motor vehicle components, and it is apparent that something more is needed.

In accordance with the present invention, this something more is provided in the form of a β-diketone. The invention employs a conventional heat stabilizer system, particularly and preferably one of the barium/cadmium organic acid salt types, in a sufficient amount to provide heat stability during heat processing, with the β-diketone serving the function of providing resistance to discoloration at moderate temperatures after the composition has been put in the form of the motor vehicle component, by any appropriate forming or shaping procedure. Thus, the β-diketone is not serving the function of a heat processing stabilizer, in the composition of the present invention, and indeed it has been demonstrated that even in the absence of the β-diketone, the compositions are stable under conventional heat processing conditions. The β-diketone provides only the desired moderate temperature stability thereafter, and this whether or not residues of the heat stabilizers remain in the shaped product.

Ebel, Burger and Herrle, German patent No. 1,073,201, U.S. Pat. No. 3,001,970, disclose that polyvinyl chloride or polyvinylidene chloride when combined with up to about 10% of a dibenzoylmethane of the formula:

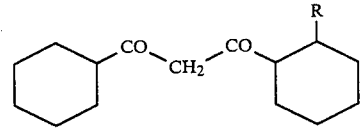

in which R is hydrogen or a hydroxyl residue, display an improved resistance to deterioration when exposed to light. Additional substituents can be present on one or both benzene rings that do not impart water solubility. Dibenzoylmethane, o-oxydibenzoylmethane, 2-oxy-5-chlorodibenzoylmethane, and 2-oxy-5-methyldibenzoylmethane, are mentioned as examples. In Example 1, it is further demonstrated that the dibenzoylmethane also improves resistance to deterioration at temperatures as high as 160° C. These results are obtained with polyvinyl chloride, polyvinylidene chloride, and copolymers of vinylidene chloride and vinyl chloride with other copolymerizable monomers.

Crochemore and Gay, U.S. Pat. No. 4,102,839, seemingly unaware of the contribution of the Ebel et al patent, propose compositions for stabilizing vinyl chloride polymers against thermodegradation composed of a divalent metal salt of an organic carboxylic acid, in combination with a β-diketone or a β-ketoaldehyde. The latter has the formula:

$$R_1-CO-CHR_2-CO-R_3$$

in which each of $R_1$ and $R_3$, which may be the same or different, represent a linear or branched alkyl or alkenyl radical having from 1 to 36 carbon atoms, an aralkyl radical having from 7 to 36 carbon atoms or an aryl or cycloaliphatic radical having less than 14 carbon atoms, said cycloaliphatic radical optionally containing one or more carbon-carbon double bonds, the aliphatic chains of said radicals optionally containing one

—O—, —CO— radical; one of $R_1$ or $R_3$ can represent a hydrogen atom; $R_2$ represents a hydrogen atom, a radical of the formula —CO—$R_4$, or —CO—O—$R_4$, wherein $R_4$ represents an alkyl radical having from 1 to 36 carbon atoms or an aryl radical if $R_1$ and $R_3$ are not aromatic, or a radical of the formula:

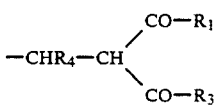

wherein $R_1$, $R_3$ and $R_4$ are as defined above;

or $R_1$ and $R_2$ together represent a divalent radical as an alkylene radical having from 1 to 12 carbon atoms or a cyclo alkylene radical having less than 14 carbon atoms, these radicals can be substituted by an aliphatic radical having from 1 to 18 carbon atoms;

in $R_1$, $R_2$ and $R_3$ the carbon atoms adjacent the indicated carbonyl groups are not doubly bonded to carbon atom and no more than one of said carbon atom is contained in an aromatic ring.

The $R_1$ and $R_3$ substituents may be substituted with a member selected from the group consisting of halo, aryl or cycloaliphatic groups having less than 14 carbon atoms, which aliphatic moieties may include —O—, —COO— or —CO— linkages within their chains.

These stabilizer combinations are used to impart resistance to the high temperatures of 180° to 200° C. undergone by the polymer during the manufacture of various shaped articles by molding, extrusion and plastic processes. These processes require high temperatures in order to bring the polymer to a sufficiently soft state, and the degradation in question occurs at these processing temperatures. Accordingly, the working Examples test the effectiveness of the stabilizer combinations by the usual oven heat test as 10×20 mm test samples cut from sheets prepared by calendering at 180° C. The results show that in the absence of the β-diketone the compositions have very poor heat stability under the test conditions.

Gay U.S. Pat. No. 4,123,399 discloses similar stabilizer compositions containing a pair of organic acid salts of calcium and zinc, a polyol, and a β-diketone of like formula to U.S. Pat. No. 4,102,839. The working Examples of the Gay patent also demonstrate the important contribution of the β-diketone to heat stability during high temperature processing of the polymer chloride resin composition.

Minagawa, Sekiguchi and Nakazawa U.S. Pat. No. 4,221,687 provides anti-yellowing additives for environmentally acceptable stabilized vinyl chloride polymer compositions from which arsenic, cadmium, lead, mercury and thallium are substantially excluded, comprising at least one basic inorganic compound of lithium, sodium, potassium, magnesium, calcium, strontium, barium, zinc, titanium, aluminum, zirconium or tin, and a 1,3-diketone compound represented by the formula:

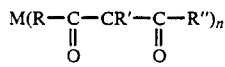

in which R is a hydrocarbon group having 1 to 18 carbon atoms, R' is a hydrogen atom, an acyl group

or a hydrocarbon group having 1 to 18 carbon atoms, R' is a hydrogen atom or a hydrocarbon group having 1 to 18 carbon atoms, M is a hydrogen or one of the metals lithium, sodium, potassium, magnesium, calcium, strontium, barium, zinc, aluminum and antimony, and n is the valence of the metal from 1 to 3.

Minagawa, Sekiguchi and Nakazawa U.S. Pat. No. 4,244,848 provide environmentally acceptable stabilizer compositions for enhancing the resistance to deterioration upon heating at 175° C. of a vinyl chloride polymer from which lead, cadmium, mercury, thallium and arsenic are substantially excluded, comprising at least one zinc, alkali metal or alkaline earth metal organic phosphate ester salt and at least one β-diketone compound having from 5 to about 30 carbon atoms, which is a cyclic or open chain β-diketone, or a zinc, alkali metal or alkaline earth metal salt thereof.

Ito, Mumajiri, Kimura and Sekiguchi U.S. Pat. No. 4,252,698 provide anti-yellowing additives for environmentally acceptable stabilized vinyl chloride polymer compositions from which arsenic, beryllium, cadmium, lead, mercury, and thallium are substantially excluded, comprising at least one overbased sulfonate or phenolate compound of lithium, sodium, potassium, magnesium, calcium, strontium, barium, zinc, titanium, aluminum, zirconium, or tin, and a 1,3-diketone compound having 5 to 30 carbon atoms, which is a cyclic or open-chain 1,3-diketone or a lithium, sodium, potassium, magnesium, calcium, strontium, barium, zinc, aluminum, tin or zirconium salt thereof.

Minagawa, Nakahara and Kitsukawa U.S. Pat. No. 4,282,141 provide additive compositions for improving the color stability of vinyl chloride polymers stabilized with environmentally acceptable stabilizers comprising a 1,3-diketone or a sodium, potassium, lithium, magnesium, barium, calcium, tin or strontium salt thereof and an organic phosphite having the formula

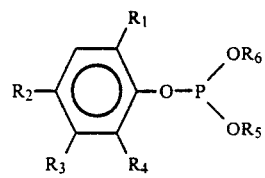

wherein $R_1$ is a phenyl, cycloalkyl, t-butyl, or t-amyl group, $R_2$ and $R_3$ are each a hydrogen atom or phenyl, cycloalkyl, or an alkyl group having one to five carbon atoms, $R_4$ is a hydrogen atom or a methyl group, and each of $R_5$ and $R_6$ independently is a hydrogen atom, an alkyl group having 1 to 18 carbon atoms, a cycloalkyl group having 5 to 20 carbon atoms, an aryl group having 6 to 12 carbon atoms, or an ether-substituted group having 3 to 80 carbon atoms and 1 to about 40 ether oxygen atoms.

J. Darby U.S. Pat. No. 2,669,548 of Feb. 16, 1954 discloses halogen-containing resin compositions having improved stability containing a mixture of a zinc salt and a calcium chelate derivative of a 1,3-dicarbonylic compound capable of keto-enol tautomerism. Zinc salts can be zinc salts of organic acids and zinc salts of weak inorganic acids, for example zinc acetate, zinc propionate, zinc octanoate, zinc ricinoleate stearate, and zinc salts of carbonic, silicic, and boric acids. Calcium chelates can be derivatives of β-diketones, β-ketoacids, and the esters of β-ketoacids, for example the calcium chelates of ethyl acetoacetate, phenyl acetoacetate, acetoacetic acid, acetylacetone, benzoylacetone, and diacetylacetone.

L. L. Wood U.S. Pat. No. 3,492,267 of Jan. 27, 1970 discloses zinc complexes of β-dicarbonyl compounds used as stabilizing additives for chlorine-containing polymers in general, and polyvinyl chloride in particular. The zinc complexes possess the general formula:

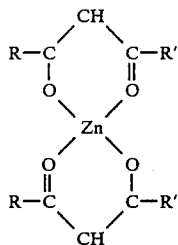

wherein R and R' are the same or different and are each hydrogen or an alkyl, alkoxy, phenyl or phenoxy group. Preferably when R represents an alkyl or alkoxy group, it contains 1 to 20 carbon atoms.

L. Weisfeld U.S. Pat. No. 3,493,536 of Feb. 3, 1970 discloses that diaroylmethane compounds of the general formula $C_6H_5CO-CHR-COC_6H_5$ wherein R is hydrogen or a monovalent hydrocarbon radical provide stabilizing action against the sensitizing effect of bismuth or antimony compounds on chlorine-containing materials.

U.S. Pat. No. 3,346,536 of Oct. 10, 1967 discloses a stabilizer combination of a ketoacetic acid compound, which can be an ester or an acid anhydride dimer thereof, with a metal salt of an organic acid. The ketoacetic acid esters have the formula:

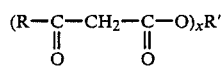

wherein R is an inert organic group having from one to about thirty carbon atoms, R' is an inert organic radical having from one to about thirty carbon atoms, and x is a number from one to ten. The ester molecule has a total of at least eight carbon atoms.

The ketoacetic acid anhydride dimers have the formula:

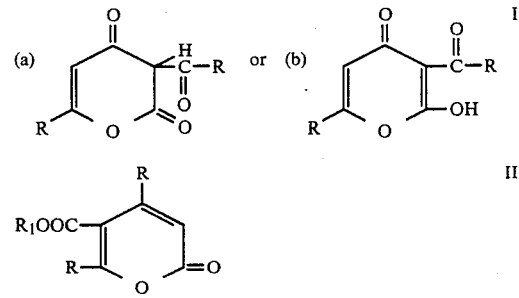

R is again as above and $R_1$ is hydrogen or R'.

It is further disclosed that this stabilizer combination can be used with additional heat stabilizers, among which phenols and organic triphosphites and acid phosphites are preferred.

In all of these patents, the compositions are described as heat stabilizing compositions, capable of improving the resistance of the polymer to deterioration when exposed to elevated temperatures during heat processing.

In accordance with the present invention, improved resistance to deterioration of motor vehicle components made of polyvinyl chloride resin compositions is obtained by combining with the polyvinyl chloride resin, at least one heat stabilizer other than a β-diketone or metal salt thereof in a sufficient amount to provide resistance to deterioration during heat processing, and a β-diketone in a sufficient amount to provide, after formation into a motor vehicle component, resistance to deterioration at moderate temperatures.

The β-diketones in accordance with the invention have the formula:

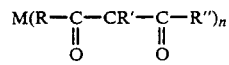

When in this formula M is a hydrogen atom, the formula becomes

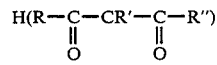

which is a way to indicate by a single expression that the hydrogen atom can be linked in more than one way, as in the tautomeric formulas I to III (i.e. formulas of compounds in readily movable equilibrium with one another)

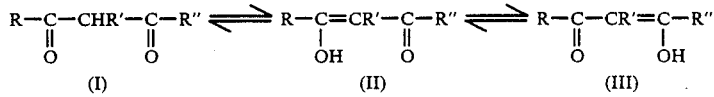

the latter two of which are identical when R and R'' are the same and non-identical when R and R'' are different. The relative proportions of tautomers I, II, and III in the β-diketone compounds is a function of the identity of R and R''.

When M is a metal, the formula:

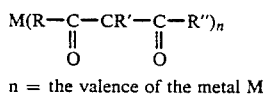

n = the valence of the metal M indicates that, while numerous structural formulas can be written differing in the location of various linkages, all are equivalent representations of a single compound which is better represented as a "hybrid" of all formulas than by any single one. In formulas V to VIII, Ph represents phenyl.

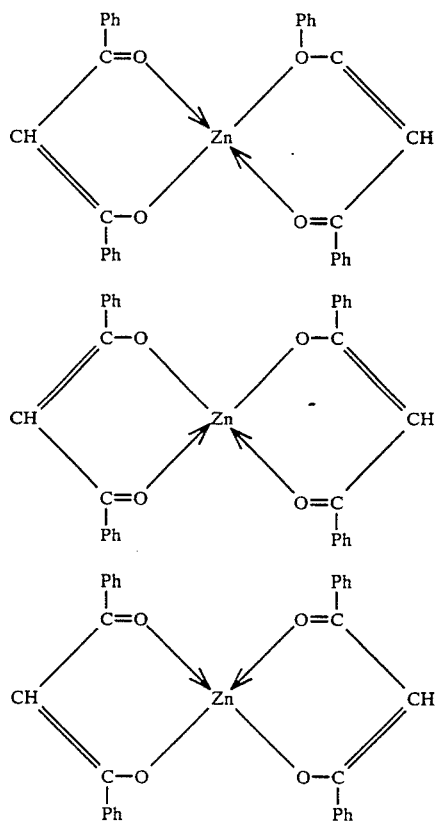

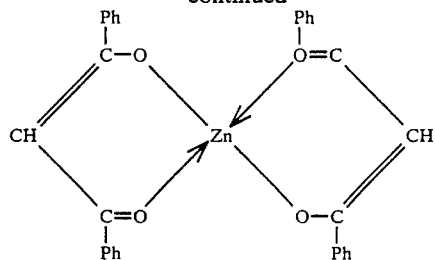

In the formula of β-diketone metal compounds, n is the valence of the metal and the number of β-diketone groups per metal atom, as shown:

| M | Li | Na | K | Mg | Ca | Sr | Ba | Zn | Al | Sb |
|---|----|----|----|----|----|----|----|----|----|----|
| n | 1  | 1  | 1  | 2  | 2  | 2  | 2  | 2  | 3  | 3  |

Hydrocarbon groups R, R', R" and R'" can be open chain or cyclic and include such aliphatic, cycloaliphatic and aromatic hydrocarbon groups as alkyl and alkenyl groups having from 11 to 18 carbon atoms; alkyl cycloalkyl, alkyl cycloalkenyl and alkyl cycloalkylalkylene having from 11 to 18 carbon atoms, and alkylcycloalkyl groups having from 11 to 18 carbon atoms, and non-condensed aryl groups (including aralkyl, cycloalkylaryl, and alkyaryl) having 6 to 18 carbon atoms, for example undecyl, dodecyl, tridecyl, pentadecyl, heptadec-3-en-1-yl, n-octadecyl, ricinoleyl, linoleyl, linolenyl, decyl cyclohexyl, hexyl cyclohexyl, cyclododecyl, phenyl, m-tolyl, p-ethylphenyl, t-butylphenyl, benzyl, cyclohexylphenyl, phenylpropyl and nonylbenzyl. The aryl groups may contain one or two halogen ring substituents, such as fluorine, chlorine or bromine.

Alkoxyhydrocarbon R, R', R" and R'" groups include n-decoxymethyl, 2-dodecoxyethyl, 2-methoxyphenyl, and 4-n-octoxyphenylbenzyl. R, R', R" and R'" alkylenedioxyhydrocarbon groups include 3(ethylenedioxydodecyl) and 3,4-methylenedioxyphenyl. R' can be hydrogen, but not R and R", and only one of R and R" can be aliphatic or cycloaliphatic.

Illustrative β-diketone compounds that can be used include the β-diketones listed below and the aluminum, antimony, barium, calcium, lithium, magnesium, potassium, sodium, strontium, and zinc derivatives thereof.

| No. 1 | 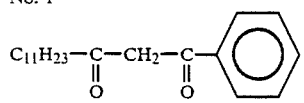 | Dodecanoyl-benzoyl-methane |
| No. 2 | 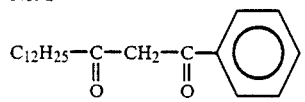 | Tridecanoyl-benzoyl-methane |
| No. 3 | 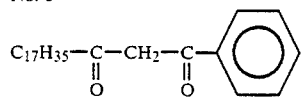 | Octadecanoyl-benzoyl-methane |

-continued

No. 4 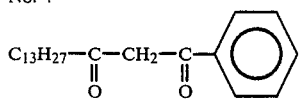 Tetradecanoyl-benzoyl-methane

No. 5 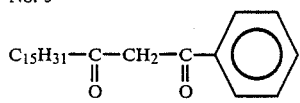 Pentadecanoyl-benzoyl-methane

No. 6 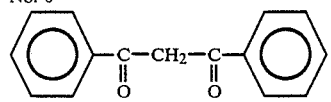 Dibenzoylmethane

No. 7 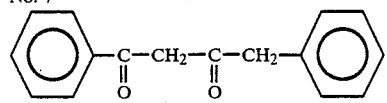 Phenylacetyl-benzoyl-methane

No. 8 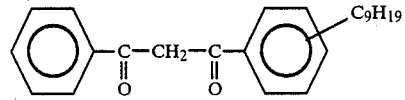 Benzoyl-nonylbenzoyl-methane

No. 9 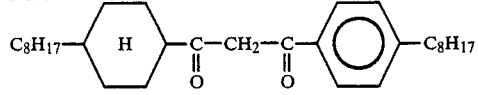 Octylhexa hydrobenzoyl octylbenzoyl methane

No. 10 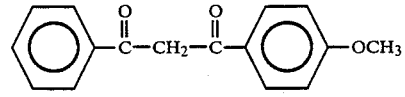 Benzoyl-p-methoxybenzoyl-methane

No. 11 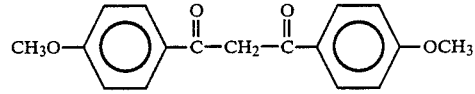 Di(p-methoxybenzoyl)methane

No. 12 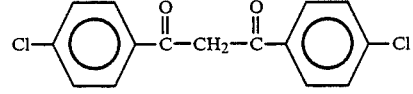 Di(p-chlorobenzoyl)methane

No. 13 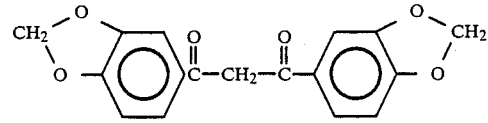 Di(3,4-methylenedioxybenzoyl)methane

No. 14 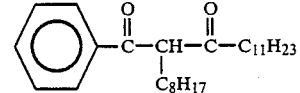 1-Dodecanoyl-1-benzoylnonane

No. 15 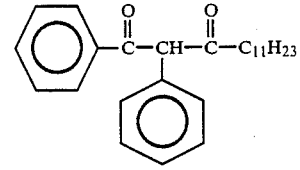 Alpha-dodecanoyl-alpha-benzoyl-toluene

| | | |
|---|---|---|
| No. 16 | 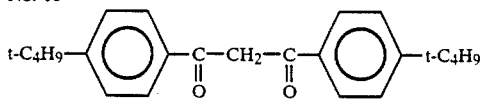 | Di(p-t-butylbenzoyl)methane |
| No. 17 | 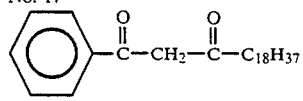 | Benzoyl-nonadecanoyl methane |

The polyvinyl chloride resin compositions in accordance with the invention containing a β-diketone and at least one heat stabilizer are stable without the β-diketone under the normal heat processing conditions, as determined by the usual heat stability tests. The β-diketone does not apparently contribute to stability under the normal heat processing conditions, since the polyvinyl chloride resin compositions are sufficiently stable without it, but it does impart stability under moderate temperatures after shaping in the form of the motor vehicle component, demonstrating that it does survive the previous heat processing.

While any known heat stabilizer for polyvinyl chloride resins can be used, the preferred heat stabilizers are alkali metal and polyvalent metal salts of organic nonnitrogenous monocarboxylic acids, having from six to twenty four carbon atoms. The polyvalent metal is preferably a bivalent nontransition metal, including barium, calcium, cadmium, magnesium, strontium, stannous tin and zinc.

The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or non-aromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenyl-acetic acid, butylbenzoic acid, ethylbenzoic acid, propylbenzoic acid, hexylbenzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The modified metal phenolates disclosed by M. Pollock in U.S. Pat. No. 3,630,979 of Dec. 28, 1971 and by M. Minagawa in U.S. Pat. No. 3,733,288 of May 15, 1973 are also suitable.

Mixtures of salts of various metals can be used, such as mixed zinc and tin salts with the alkaline earth metal salts, e.g., barium and zinc stearates, as in U.S. Pat. No. 2,446,976.

In lieu of but preferably in addition to the polyvalent metal salt, organic phosphites can be used.

The organic phosphite can be any organic phosphite having one or more organic radicals attached to phosphorus through oxygen. These radicals can be monovalent radicals in the case of the triphosphites, diphosphites and monophosphites, which can be defined by the formula:

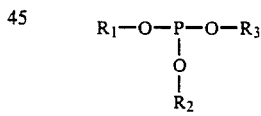

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

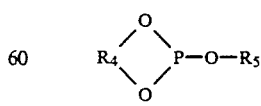

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositions of the invention are mixed heterocyclic-open chain phosphites of the type:

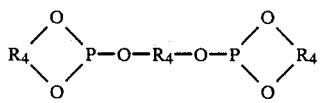

More complex phosphites are formed from trivalent organic radicals, of the type:

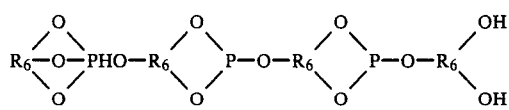

in which $R_6$ is a trivalent organic radical of any of the types of $R_1$ to $R_5$, inclusive, as defined above.

A particularly useful class of complex phosphite are the tetraoxadiphosphaspiro undecanes of the formula

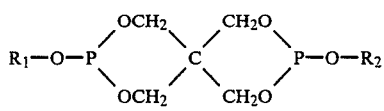

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl.

An especially preferred class of organic phosphites have a bicyclic aromatic group attached to phosphorus through oxygen, with no or one or more phenolic hydroxyl groups on either or both of the aromatic rings. These phosphites are characterized by the formula:

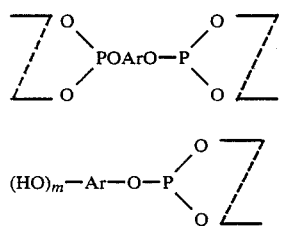

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional bicyclic aromatic groups of the type $(HO)_m$—Ar.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-a-naphthyl phosphite, tri(phenylphenyl) phosphite, tri(2-phenyl ethyl) phosphite, monododecyl phosphite, di(p-tert-butyl phenyl) phosphite, decyl phenyl phosphite, tert-butylphenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyl-dioxaphosphorinane, 2-cyclohexyloxy-5,5-diethyl dioxaphosphorinane, monophenyl phosphite, 2-ethylhexyl phosphite, isooctyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-a-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary pentaerythrityl phosphites are 3,9-diphenoxy-2,4,8,10-tetraoxa-3,9-diphosphaspiro-(5,5)-undecane (diphenylpentaerythritol-diphosphite), 3,9-di(decyloxy)-2,4,8,10-tetraoxa-3,9-diphosphaspiro-(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyoxy-2,4,8,10-tetraoxa-3,9-diphosphaspiro-(5,5)-undecane; 3,9-di(methoxyethoxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethoxy)-2,4,8,10-tetraoxa-3,9-diphosphaspiro-(5,5)-undecane; 3,9-di(butoxyethoxy)-2,4,8,10-tetraoxa-3,9-diphosphaspiro-(5,5)-undecane; 3-methoxyethoxy-9-butoxyethoxy-2,4,8,10-tetraoxa-3,9-diphosphaspiro-(5,5)-undecane; 3,9-di(methoxyethoxyethoxy)-2,4,8,10-tetraoxa-3,9-diphosphaspiro-(5,5)-undecane; 3,9-di(butoxyethoxythoxy-2,4,8,10-tetraoxa-3,9-diphosphaspiro-(5,5)-undecane; 3,9-di(methoxyethoxyethoxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro-(5,5)-undecane (where the (polyethoxy)ethoxy group has an average molecular weight of 350), 3,9-di(methoxy(polyethoxy)ethoxy)-2,4,8,10-tetraoxa-3,9-diphosphaspiro-(5,5)-undecane (where the (polyethoxy)-ethoxy group has an average molecular weight of 550).

Exemplary of the bis aryl phosphites are: bis(4,4'-thio-bis(2-tertiary-butyl-5-methyl-phenol)) isooctyl phosphite, mono(4,4'-thio-bis(2-tertiary-butyl-5-methyl-phenol)) diphenyl phosphite, tri-(4,4'-n-butlidene-bis(2-tertiary-butyl-5-methyl-phenol)) phosphite, (4,4'-benzylidene-bis(2-tertiary-butyl-5-methyl-phenol)) diphenyl phosphite, isooctyl 2,2'-bis(parahydroxyphenyl) propane phosphite, tridecyl 4,4'-n-butylidene-bis(2-tertiary-butyl-5-methyl-phenol) phosphite, 4,4'-thiobis(2-tertiary-butyl-5-methylphenol) phosphite, 2-ethylhexyl-2,2'-methylene-bis(4-methyl-6-1'-methylcyclohexyl) phenol phosphite, tri(2,2'-bis-(para-hydroxyphenyl)propane) phosphite, tri(4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl 4,4'-n-butylidene-bis(2-tertiary-butyl-5-methyl phenyl) diphosphite, tetra-isooctyl 4,4'-thiobis(2-tertiary-butyl-5-methyl phenyl) diphosphite, 2,2'-methylene-bis(4-methyl-6-1'-methyl cyclohexyl phenyl) polyphosphite, isooctyl-4,4'-isopropylidene-bis-phenylpolyphosphite, 2-ethylhexyl-2,2'-methylene-bis(4-methyl-6,1'-methyl-cyclohexyl) phenyl triphosphite, tetratridecyl-4,4'-oxydiphenyl diphosphite, tetra-n-dodecyl-4,4'-n-butylidenebis (2-tertiary-butyl-5-methylphenyl) diphosphite, tetra-tridecyl-4,4'-iso-propylidene bisphenyl diphosphite, hexatridecyl butane-1,1,3-tris(2'-methyl-5'-tertiary-butylphenyl-4') triphosphite.

Preferred classes of additional stabilizers that can be used include the phenols, aliphatic polyhydroxy compounds; esters, amides, and hydrazides of thioalkylenedicarboxylic acids and nitrilotrialkylenetricarboxylic acids; ketoacetic acid compounds; and organic nitrogen compounds such as the esters of betaaminocrotonic acid, diphenylthiourea, and 2-phenylindole. Phenol stabilizers can be included in amounts corresponding to 0.01 to about 0.2 parts per 100 parts of polymer being stabilized. Typical phenol stabilizers are butylated hydroxy-toluene (BHT), 4,4'-isopropylidenebisphenol, and 1,1,3-tris(2'-methyl-4'-hydroxy-5'-t-butylphenyl) butane.

The phenol stabilizers contain one or more phenolic hydroxyl groups, and one or more phenolic nuclei and can contain from about eight to about three hundred carbon atoms. In addition, the phenolic nucleus can contain any oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

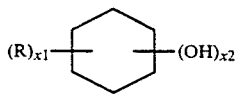

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

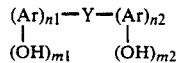

wherein Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarboxylic group having condensed or separate phenyl rings: each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

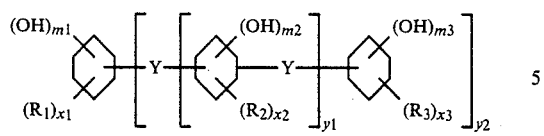

wherein $R_1$, $R_2$ and $R_3$ are inert substituent groups as described in the previous paragraph, $m_1$ and $m_3$ are integers from one to a maximum of five, $m_2$ is an integer from one to a maximum of four, $x_1$ and $x_3$ are integers from zero to four, and $x_2$ is an integer from zero to three; $y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valence Y groups, connecting more than four Ar groups, can also be used. According to their constitution, the Y groups can be assigned to subgenera as follows:

(1) Y groups where at least one carbon in a chain or cyclic arrangement connect the aromatic groups, such as —$CH_2$—$CH_2$—; —$(CH_2)_5$—; —$CH_2$—;

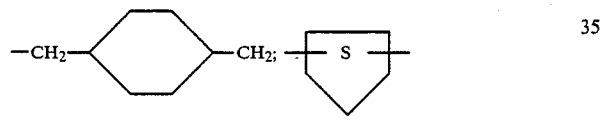

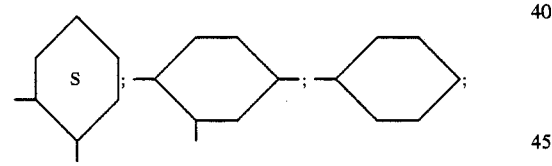

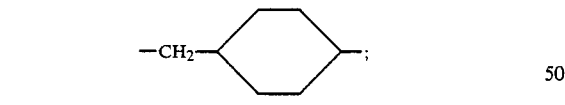

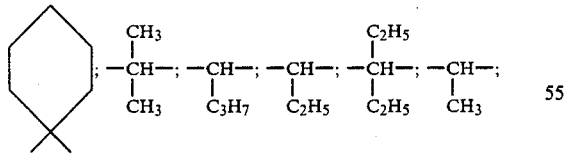

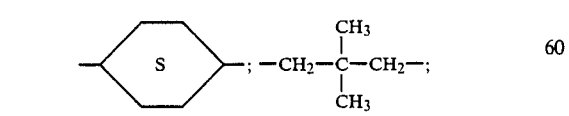

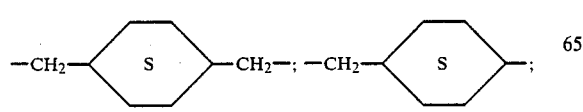

-continued

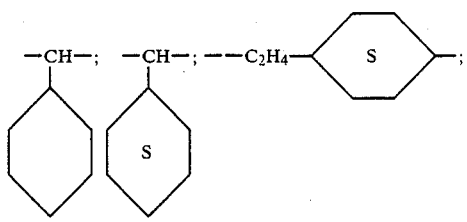

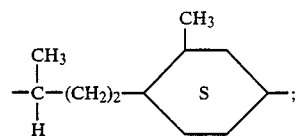

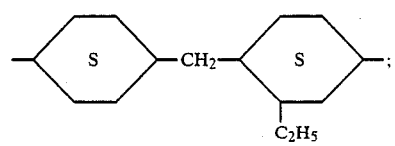

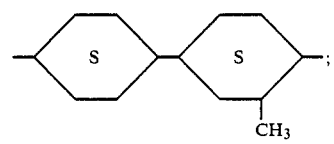

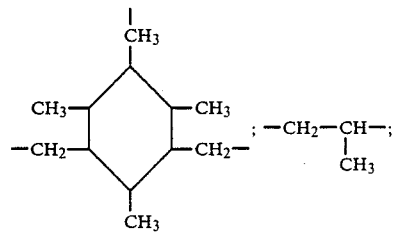

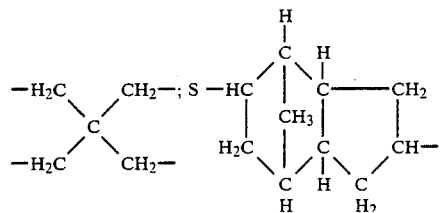

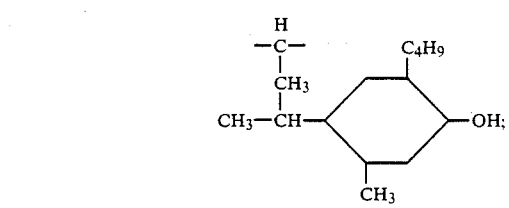

(2) Y groups where only atoms other than carbon link the aromatic rings, such as

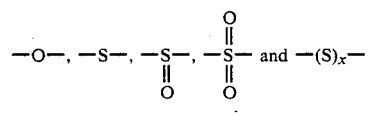

where x is a number from one to ten;

(3) Y groups made up of more than a single atom including both carbon and other atoms linking the aromatic nuclei, such as

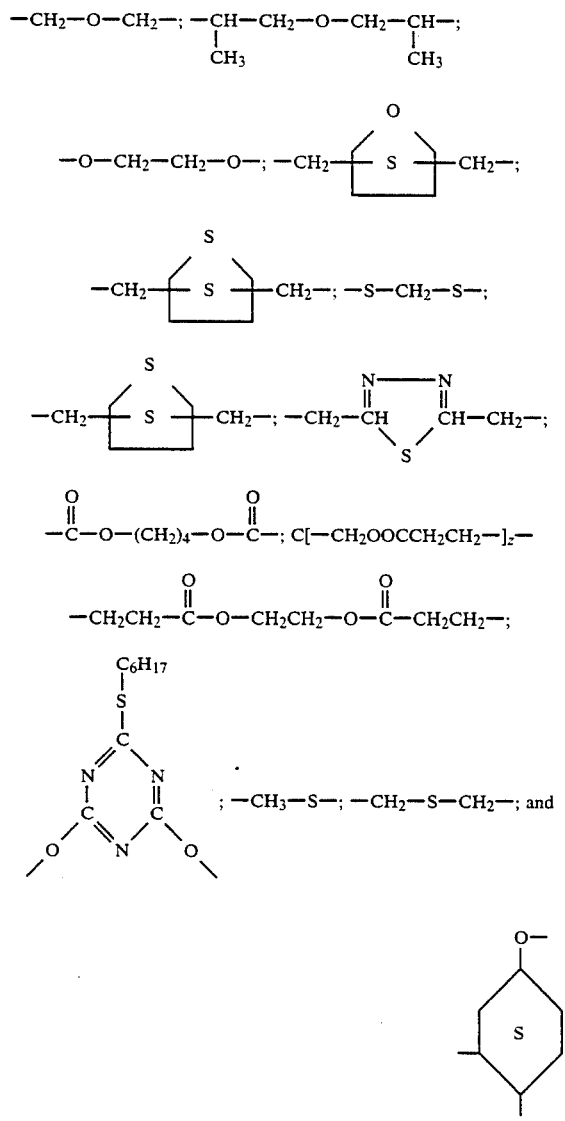

Although the relation of effectiveness of chemical structure is insufficiently understood, any of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-ditert-butyl-4-methylphenol, 2-tert-butyl-4-methoxyphenol, 2,4-dinonylphenol, 2,3,4,5-tetradecylphenol, tetrahydro-α-naphthol, o-, m- and p-cresol, o-, m- and p-phenyl-phenol, o-, m-and p-xylenols, the carvenols, symmetrical xylenol, thymol, o-, m- and p-nonylphenol, o-, m- and p-dodecylphenol, and o-, m- and p-octyl-phenol, o- and m-tertbutyl-p-hydroxyanisole, p-n-decyloxy-phenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol methyl-p-hydroxybenzoate, p-di-chlorobenzoyl-aminophenol and p-hydroxysalicyl anilide.

Exemplary polyhydric phenols are orcinol, propyl gallate, cetechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-ditertiary-butyl-resorcinol, 2,6-diisopropyl-phloroglucinol.

Exemplary polyhydric polycyclic phenols methylene-bis-(2,6-ditertiarybutyl-phenol), 2,2-bis-(4-hydroxyphenyl)propane, methylene-bis(p-cresol), 4,4'-benzylidenebis-(2-tertiary-butyl-5-methylphenol), 4,4'-cyclohexylidenebis-(2-tertiary-butylphenol), 2,2'-methylene-bis(4-methyl-6-(1'-methylcyclohexyl)-phenol), 2,6-bis(2'-hydroxy-3'-tertiary-butyl-5'-methyl-benzyl)-4-methylphenol, (2-tertiary-butyl-5-methylphenol), 2,2'-bis(4-hydroxy-phenyl)butane, ethylenebis-(p-cresol), 4,4'-oxobis-phenol, 4,4'-oxobis(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol), 2,2'-methylene-bis-(4-methyl-6-(1'-methyl-cyclohexyl)phenol), 4,4'-cyclohexylenebis-(2-tertiary-butyl-phenol), 2,6-bis-(2'-hydroxy-3'-t'-butyl-5'-methyl-benzyl)-4-methylphenol, 4,4'-oxobis(-naphthalene-1,5-diol), 1,3'-bis(naphthalene-2,5-diol)propane, and 2,2'-butylenebis-(naphthalene-2,7-diol), (3-methyl-5-tert-butyl-4-hydroxyphenyl)-4'-hydroxyphenyl)propane, 2,2'-methylenebis-(4-methyl-5-isopropylphenol), 2,2'-methylenebis-(5-tert-butyl-4-chlorophenol), (3,5-di-tert-butyl-4-hydroxyphenyl)-(4'-hydroxyphenyl)ethane, (2-hydroxyphenyl)-(3',5'-ditert-butyl-4',4-hydroxyphenyl)ethane, 2,2'-methylene-bis-(4-octylphenol), 4,4'-propylenebis-(2-tert-butylphenol), 2,2'-isobutylenebis-(4-nonylphenol), 2,4-bis-(4-hydroxy-3-t-butylphenoxy)-6-(n-octylthio)-1,3,5-triazine, 2,4,6-tris(4-hydroxy-3-t-butylphenoxy)-1,3,5-triazine, 2,2'-bis-(3-t-butyl-4-hydroxyphenyl)thiazolo-(5,4-d)thiazole, 2,2'-bis(3-methyl-5-t-butyl-4-hydroxyphenyl)thiazolo-(5,4-d)thiazole, 4,4'-bis(4-hydroxyphenyl)pentanoic acid octadecyl ester, cyclopentylene-4,4'-bisphenol, 2-ethylbutylene-4,4'-bisphenol, 4,4'-cyclooctylenebis(2-cyclohexylphenol), β,β-thiodiethanol-bis(3-tert-butyl-4-hydroxyphenoxy acetate), 1,4-butane-diobis(3-tert-butyl-4-hydroxyphenoxy acetate), pentaerythritoltetra(4-hydroxyphenol propionate), 2,4,4'-trihydroxy benzophenone, bis(2-tert-butyl-3-hydroxy-5-methylphenyl sulfide, bis(2-tert-butyl-4-hydroxy-5-methylphenyl)sulfide, bis(2-tert-butyl-4-hydroxy-5-methylphenyl sulfoxide), bis-(3-ethyl-5-tert-butyl-4-hydroxybenzyl)sulfide, bis(2-hydroxy-4-methyl-6-tert-butylphenyl)sulfide, 4,4'-bis(4-hydroxyphenyl)pentanoic acid octadecyl thiopropionate ester, 1,1,3-tris(2'-methyl-4'-hydroxy-5'-tert-butylphenyl)butane, 1,1,3-tris-(1-methyl-3-hydroxy-4-tert-butylphenyl)butane, 1,8-bis(2-hydroxy-5-methylbenzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene) bis-(4-methoxy-6-tert-butylphenol) and pentaerythritol hydroxyphenyl propionate.

A particularly desirable class of polyhydric polycyclic phenols are the dicyclopentadiene polyphenols, which are of the type:

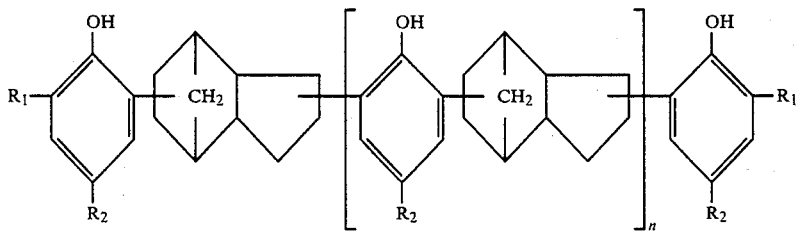

in which $R_1$ and $R_2$ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by the dicyclopentadiene tri(2-tert-butyl-4-methyl-phenol) of the formula:

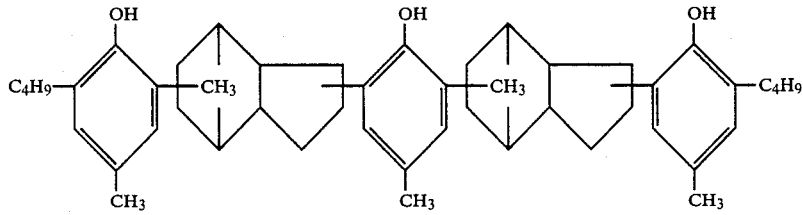

The polyhydric polycyclic phenols used in the invention can also be condensation products of phenol or alkyl-phenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product merely free from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see, e.g., U.S. Pat. No. 3,124,555, U.S. Pat. No. 3,242,135, British patent No. 961,504.

Aliphatic polyhydroxy compounds can be included in amounts corresponding to 0.1 to about 1 part per 100 parts of polymer being stabilized. Typical aliphatic polyhydroxy compounds are glycerol, polyglycerol, monodi-, and tri-pentaerythritol, mannitol, sorbitol, and partial esters of these with saturated and unsaturated fatty acids having 6 to 22 carbon atoms.

The esters, amides, and hydrazides of thiodialkylene dicarboxylic acids and nitrilotri-alkylenetricarboxylic acids can be included in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris(ethylamide), NTA bis(hydroxyethyl) N-butylamide, 3,3'-thiodipropionyldihydrazide and 6,6'-thiodihexanoyldihydrazide.

The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same or different from the $R_1$ radical, (c) a polymeric chain of n thiodipropionic acid ester units:

$$R_1O[OCCH_2CH_2SCH_2CH_2COOXO]_nOCCH_2CH_2-S-CH_2CH_2COOZ$$

wherein Z is hydrogen, $R_2$ or M; n is the number of thiodipropionic acid ester units in the chain; and X is a bivalent hydrocarbon group of the type of $R_1$; the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX-O]_nOCCH_2CH_2SCH_2CH_2COOZ$
(d) $[R_1OOCCH_2CH_2SCH_2CH_2COO]_2M$

In the above formulae, $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

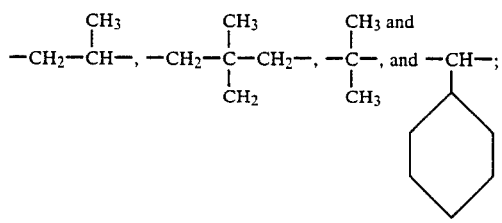

arylene radicals such as phenylene

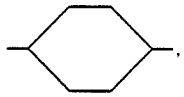

methylenephenylene

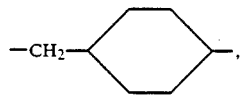

dimethylene phenylene,

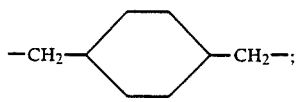

and alicyclene radicals such as cyclohexylene

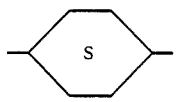

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris(acetoacetate) and dehydroacetic acid.

The keto acetic acid compound should be nonvolatile and stable at processing temperatures. It should also be nitrogen-free. In general, compounds having at least eight carbon atoms in the molecule fulfill these requirements. The free keto acetic acids, for some reason that is unknown, do not possess the stabilizing effectiveness of the esters or of the anhydride dimers. However, metal salts of these keto acids can be used as the metal salt component of the stabilizer combination of the invention, and in combination with the ester and/or anhydride dimer have excellent stabilizing effectiveness.

The keto acetic acid esters of this invention have the following general formula:

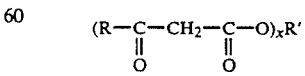

wherein R is an inert organic group having from one to about thirty carbon atoms, R' is an inert organic radical having from one to about thirty carbon atoms, and x is a number from one to ten. The ester molecule has a total of at least eight carbon atoms.

R and R' can be hydrocarbon groups, and can be alkyl, alkenyl, aryl, alkylaryl, aryl alkyl, cycloalkyl, cycloalkenyl, and heterocyclic. The open chain groups can be straight or branched, and the cyclic and alicyclic groups can be saturated or unsaturated. The R and R' groups can also be substituted by inert groups such as halogen (fluorine, chlorine, bromine and iodine) alkoxy or epoxy

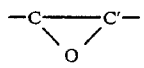

hydroxy OH and ether ≡C—O—C≡ groups. There will not usually be more than ten of such substituents, depending of course upon the number of available substituent positions in the R and R' groups.

Thus, the R' radical for example can include free hydroxyl OH groups, up to a practical maximum of ten, but generally not more than one hydroxyl group per carbon atom, and the R' radical can carry a plurality of

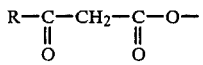

ester groups, up to a total of about ten, the value of x. It will be understood that where R' has more than one OH group, the value of x represents only an average value of the number of possible ester species that may exist, dependent on the total number of H groups on R'. For instance, in the case of a di-ester (x=2), where R' has three free OH groups, there can also be pentaester, tetraester, triester and monoester species present. Indeed, in such cases, x can be a decimal number, for instance, 2.5, indicating the presence of a mixture of monoester, diester, triester and higher ester species in proportions to give this average value for x. Those skilled in the art will perceive the increased possibilities as x increases to ten or more.

Exemplary R and R' hydrocarbon groups are methyl, ethyl, n-propyl, isopropyl, n-butyl, isobutyl, sec-butyl, tert-butyl, n-amyl, iso-amyl, tert-amyl, hexyl, heptyl, tert-octyl, 20ethyl hexyl, isononyl, decyl, undecyl, dodecyl, palmityl, stearyl, oleyl, ricinoleyl, linoleyl, linolenyl, behenyl, tridecyl, phenyl, xylyl, tolyl, naphthyl, cyclohexyl, methylcyclohexyl, cyclopentyl, tetrahydrofurfuryl, cycloheptyl, isononylphenyl, furyl, and pyranyl.

Exemplary hydroxy-substituted R' groups include hydroxyethyl, 2-hydroxypropyl, 3-hydroxypropyl, 1-hydroxyamyl, 2-hydroxyamyl, 2,2-dimethylol propyl, 2,2-dihydroxyamyl, 1,1-methylol hydroxybutyl, 2-(dihydroxyethyl)-butyl, 1-(dihydroxy ethyl)propyl, 3-4 dihydroxyheptyl, 4-5 dihydroxyoctyl, 7,8-dihydroxyhepta-decyl, 6,7-dihydroxytetradecyl, 1,2,3-trimethylol octadecyl, 1,2,3,4,5,6-hexahydroxy heptyl, 10-hydroxyeicosyl, 2,3-dihydroxypropyl, 4-hydroxybutyl, 3,4-dihydroxybutyl, 2,3,4-trihydroxybutyl, 1,3,4-trihydroxybutyl.

These esters are readily prepared according to known procedures by transesterification of a simple ester of the corresponding keto acetic acid, such as ethyl acetoacetate, with the corresponding alcohol. If the corresponding keto acetic acid is stable, direct esterification is possible. If a polyhydric alcohol is used, mixed esters of the acid and alcohol are obtained, according to the molar proportions of each, and mixtures of the various possible esters will also be present in most case.

Typical esters are:

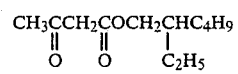 (1)

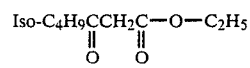 (2)

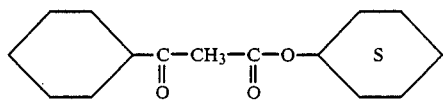 (3)

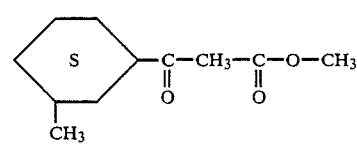 (4)

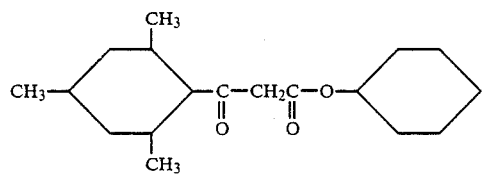 (5)

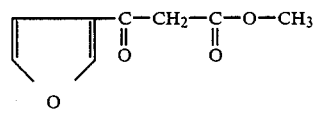 (6)

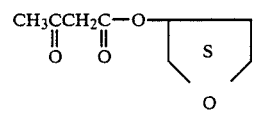 (7)

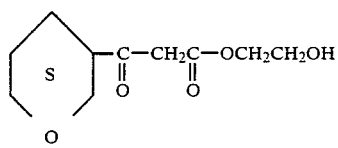 (8)

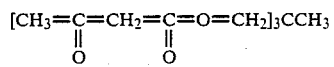 (9)

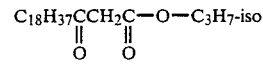 (10)

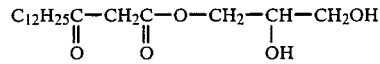 (11)

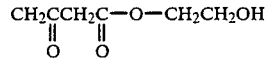 (12)

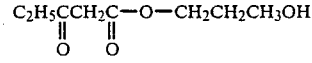 (13)

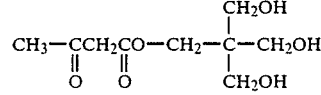 (14)

-continued

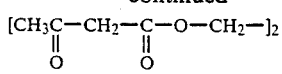 (15)

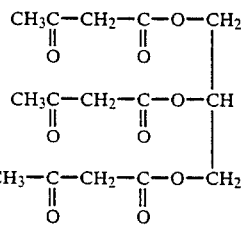 (16)

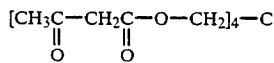 (17)

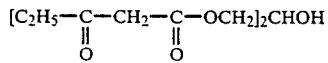 (18)

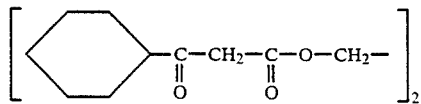 (19)

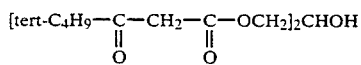 (20)

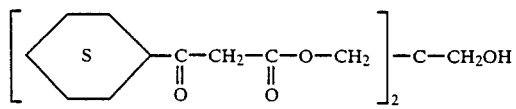 (21)

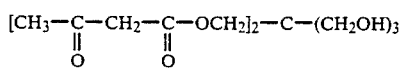 (22)

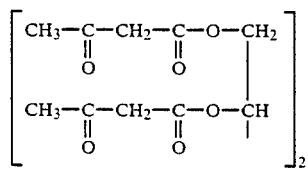 (23)

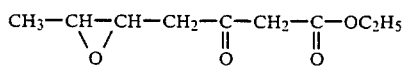 (24)

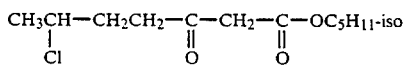 (25)

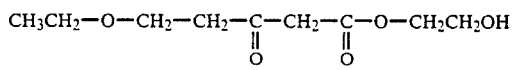 (26)

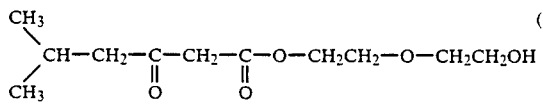 (27)

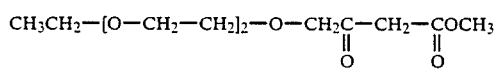 (28)

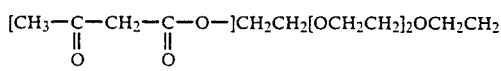 (29)

-continued

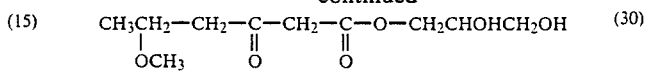 (30)

The keto acid anhydride dimers have the formula:

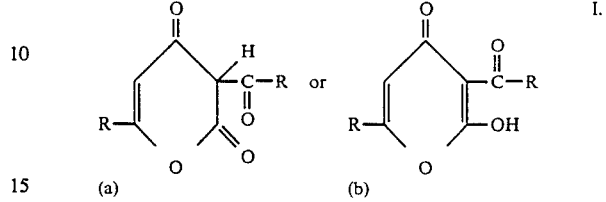

(a)   (b)   I.

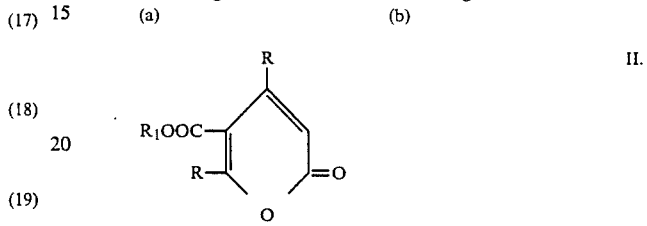

II.

R is again as above and $R_1$ is hydrogen or R'.

Exemplary are dehydroacetic acid, isodehydroacetic acid, dehydropropionyl acetic acid, dehydrobenzoyl acetic acid, isodehydro-3,4-dichlorobenzoylacetic acid, and esters of isodehydroacetic acid such as the methyl, ethyl, n-butyl 2-ethyl hexyl and glyceryl esters.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2'-thiodiethyl 3-aminocrotonate; thiocarbanilide and 2-phenylindole, 1,3-dibutylthiourea, phenylurea, and p-ethoxyphenylurea.

The stabilizer compositions of this invention are effective with any vinyl chloride polymer. The term "vinyl chloride polymer" as used herein is inclusive of any polymer formed at least in part of the recurring group, $$-CH-C- \atop Cl \ \ X \atop \phantom{-CH-}X$$

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after chlorinated polyvinyl chlorides as a class, for example, those disclosed in British patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The preparation of the stabilized polymer composition is easily accomplished by conventional procedures. The selected stabilizer combination along with such compounding ingredients as plasticizers, colors, lubricants, antistatic agents etc. as may be needed, is blended with the polymer being stabilized, using, for instance, plastic mixing rollers, at a temperature at which the mix is fluid and thorough blending facilitated, typically at from 120° to 180° C. for a time sufficient to form a homogeneous sheet, five minutes, usually. After the mass is formed, it is sheeted off in the usual way.

A sufficient amount of the heat stabilizer or combination is used to improve the resistance of the synthetic polymer to deterioration in physical properties during heat processing, including, for example, discoloration, reduction in melt viscosity and embrittlement. Very small amounts are usually adequate. Amounts within the range from about 0.001 to about 5% total heat stabilizers by weight of the polymer are satisfactory. Preferably, from 0.01 to 3% is employed, for optimum stabilization.

The $\beta$-diketone is used in an amount to impart resistance to deterioration when exposed to moderate temperatures within the range from about 150° to about 280° F. (corresponding to about 65° C. to 138° C.) after heat processing, including, for example, discoloration and embrittlement. Very small amounts are usually adequate. Amounts within the range from about 0.001 to about 5% $\beta$-diketone by weight of the polymer are satisfactory. Preferably, from 0.01 to 3% is employed, for optimum effect.

When all components are solids, the stabilizer systems of the invention are readily rendered in solid particulate form, comprising a blend of:
(a) $\beta$-diketone in an amount of from about 10 to about 35 parts by weight;
(b) heat stabilizer in an amount of from about 10 to about 35 parts by weight, including, for example,
  (1) a polyvalent metal organic acid salt in an amount of from about 10 to about 35 parts by weight;
  (2) a phenolic antioxidant in an amount from about 10 to about 35 parts by weight;
  (3) other heat or light stabilizers.

When the stabilizer is a liquid, the $\beta$-diketone can be dissolved therein, with gentle warming and agitation if necessary. Particularly preferred $\beta$-diketones found soluble in liquid stabilizers include dibenzoylmethane and stearoylbenzoylmethane.

The stabilizer compositions of the invention can include any conventional polyvinyl chloride resin additives, including in addition lubricants such as stearic acid, paraffin wax, polyethylene wax, stearamide, petrolatum, and natural waxes, as well as emulsifiers, antistatic agents, flame-proofing agents, pigments and fillers.

The stabilizer compositions of the invention can be compounded with polyvinyl chloride resins, properly formulated, and shaped by standard plastics processing techniques (including calendering, extrusion, injection and compression molding, blow molding, rotational molding, slush and dip molding, solution casting, electrostatic spray and fluidized bed coating), to form a wide variety of motor vehicle components for both interior and exterior use, such as dashboards, seat coverings, floor mats, door panels, arm and head rests, receptacles, compartments, body side moldings, window trim moldings, seat corners and head liners, door and window knobs, and crash dashboards.

Compound components such as plasticizers, stabilizers, lubricants, impact modifiers, processing aids, fillers, colorants, antistatic agents, tackifiers, flame retardants, fungicides, antiblocking agents, etc. can be incorporated to facilitate processing of such motor vehicle components.

The following Examples in the opinion of the inventors represent preferred embodiments of their invention.

EXAMPLES 1 TO 5

Polyvinyl chloride resin compositions were made up having the following formulation:

| Ingredient | Parts by Weight |
| --- | --- |
| Polyvinyl chloride homopolymer (Diamond 450) | 100 |
| Dioctyl phthalate | 50 |
| Drapex 6.8 (epoxidized soybean oil) | 8 |
| Calcium carbonate (Atomite) | 20 |
| Stearic acid | 0.3 |
| Stabilizer | 2.5 |
| Composed of: | |
| Barium nonyl phenate (12.5% Ba, approx. 50% solution) | 21.2 |
| Zinc 2-ethyl hexoate (8.5% Zn, 50% solution) | 21.2 |
| Phenyl diisodecyl phosphite | 42.6 |
| Stearoyl benzoyl methane | 0 to 5 as noted in Table I |
| Mineral spirits | 10 to 15 to make up difference in weight of stearoyl benzoyl methane |

The stabilizer system, dioctyl phthalate, epoxidized soybean oil, calcium carbonate and stearic acid were blended with the polyvinyl chloride resin on a two-roll mill, and then sheeted off. To determine heat processing stability, samples were cut off from the sheets and heated in a Geer oven at 350° F. and at 375° F., for up to two hours. Samples were withdrawn at fifteen minute intervals to follow the progress of any deterioration, as evidenced by discoloration and/or embrittlement. Deterioration was rated according to the following scale:

| Rating | Color |
|---|---|
| 0 | Unchanged |
| 1 | First perceptible discoloration (yellow or buff) |
| 2 | Very pale discoloration (yellow or buff) |
| 3 | Pale yellow or buff |
| 4 | Light yellow or buff |
| 5 | Yellow |
| 6 | Deep yellow |
| 7 | Yellow with black edges |
| 8 | Dark yellow brown |
| 9 | Dark brown |
| 10 | Black |

The results are shown in Tables I and II:

TABLE I

| | Color Rating at 350° C. | | | | | |
|---|---|---|---|---|---|---|
| | Control | Examples | | | | |
| | | 1 | 2 | 3 | 4 | 5 |
| Amount of $\beta$-diketone | none | 1% | 2% | 3% | 4% | 5% |
| Time (minutes) | | | | | | |
| 0 | 0 | 0 | 0 | 0 | 0 | 0 |
| 15 | 0 | 0 | 0 | 0 | 0 | 0 |
| 30 | 0 | 0 | 0 | 0 | 0 | 0 |
| 45 | 0 | 0 | 0 | 0 | 0 | 0 |
| 60 | 0 | 0 | 0 | 0 | 0 | 0 |
| 75 | 1 | 1 | 1 | 1 | 1 | 1 |
| 90 | 1 | 1 | 1 | 1 | 1 | 1 |
| 105 | 2 | 2 | 2 | 2 | 2 | 2 |
| 120 | 3 | 3 | 3 | 3 | 3 | 3 |

TABLE II

| | Color Rating at 375° F. | | | | | |
|---|---|---|---|---|---|---|
| | Control | Examples | | | | |
| | | 1 | 2 | 3 | 4 | 5 |
| Amount of $\beta$-diketone | none | 1% | 2% | 3% | 4% | 5% |
| Time (minutes) | | | | | | |
| 0 | 0 | 0 | 0 | 0 | 0 | 0 |
| 15 | 0 | 0 | 0 | 0 | 0 | 0 |
| 30 | 0 | 0 | 0 | 0 | 0 | 0 |
| 45 | 3 | 3 | 3 | 3 | 3 | 3 |
| 60 | 7 | 7 | 7 | 7 | 7 | 7 |
| 75 | 8 | 8 | 8 | 8 | 8 | 8 |
| 90 | 9 | 9 | 9 | 9 | 9 | 9 |
| 105 | 10 | 10 | 10 | 10 | 10 | 10 |

The results in Tables I and II show that the $\beta$-diketone, stearoyl benzoyl methane, has no noticeable effect on heat stability at 350° and 375° F., since the Control is equivalent to any of Examples 1 to 5.

Samples also were placed in a Geer oven and held at 215° F. for up to seven days to simulate the moderate temperatures experienced by a motor vehicle component in a motor vehicle, such as automobile, with the following results:

TABLE III

| | Color Rating at 215° F. | | | | | |
|---|---|---|---|---|---|---|
| | Control | Examples | | | | |
| | | 1 | 2 | 3 | 4 | 5 |
| Amount of $\beta$-diketone | none | 1% | 2% | 3% | 4% | 5% |
| Time (days) | | | | | | |
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 1 | 0 | 0 | 0 | 0 | 0 |
| 5 | 1 | 0 | 0 | 0 | 0 | 0 |
| 6 | 2 | 0 | 0 | 0 | 0 | 0 |
| 7 | 2 | 0 | 0 | 0 | 0 | 0 |

TABLE III-continued

| | Color Rating at 215° F. | | | | | |
|---|---|---|---|---|---|---|
| | Control | Examples | | | | |
| | | 1 | 2 | 3 | 4 | 5 |
| Amount of $\beta$-diketone | none | 1% | 2% | 3% | 4% | 5% |

The $\beta$-diketone, stearoyl benzoyl methane, clearly overcomes the instability evidenced by the Control, even in an amount as low as 1%.

EXAMPLES 6 TO 9

Polyvinyl chloride resin compositions were made up having the following formulation:

| Ingredient | Parts by Weight | | | | | |
|---|---|---|---|---|---|---|
| Polyvinyl chloride homopolymer | 100 | | | | | |
| Dioctyl phthalate | 50 | | | | | |
| Drapex 6.8 (epoxidized soybean oil) | 5 | | | | | |
| Calcium carbonate (Atomite) | 20 | | | | | |
| Stearic acid | 0.3 | | | | | |
| Stabilizer | 3.0 | | | | | |
| | Controls | | Examples | | | |
| Composed of: | 1 | 2 | 6 | 7 | 8 | 9 |
| Barium nonyl phenate solution 12.5% Ba | 21.2 | 21.2 | 21.2 | 21.2 | 21.2 | 21.2 |
| Zinc 2-ethyl hexoate (8.5% Zn)(50% solution) | 21.2 | — | 21.2 | 21.2 | 21.2 | — |
| Phenyl diisodecyl phosphite | 42.6 | 42.6 | 42.6 | 42.6 | 42.6 | 42.6 |
| ZnCl$_2$.phenyl diisodecyl phosphite (PDDP) | — | 15 | — | — | — | 15 |
| Stearoyl benzoyl methane | — | — | 1.0 | 0.25 | 0.5 | 1.0 |
| Mineral spirits | 15.0 | 15.0 | 14.0 | 14.75 | 14.5 | 15.0 |

The stabilizer system and other ingredients (dioctyl phthalate, epoxidized soybean oil, calcium carbonate and stearic acid) were blended with the polyvinyl chloride resin on a two-roll mill, and then sheeted off. Samples were cut off from the sheet and heated in a Geer oven at 350° F. and 375° F. for up to two hours. Samples were withdrawn at fifteen minute intervals to follow the progress of any deterioration as evidenced by discoloration and/or embrittlement. Deterioration was rated according to the scale of Examples 1 to 5. The results are shown in Tables IV to VI:

TABLE IV

| | Color Rating at 350° F. | | | | | |
|---|---|---|---|---|---|---|
| | Controls | | Examples | | | |
| Time (minutes) | 1 | 2 | 6 | 7 | 8 | 9 |
| 0 | 0 | 0 | 0 | 0 | 0 | 0 |
| 15 | 0 | 0 | 0 | 0 | 0 | 0 |
| 30 | 0 | 0 | 0 | 0 | 0 | 0 |
| 45 | 0 | 1 | 0 | 0 | 0 | 1 |
| 60 | 0 | 2 | 0 | 0 | 0 | 2 |
| 75 | 0 | 3 | 0 | 0 | 0 | 3 |
| 90 | 1 | 4 | 1 | 1 | 1 | 4 |
| 105 | 7 | 5 | 7 | 7 | 7 | 5 |
| 120 | 7 | 5 | 7 | 7 | 7 | 5 |

TABLE V

| | Color Rating at 375° F. | | | | | |
| | Controls | | Examples | | | |
| Time (minutes) | 1 | 2 | 6 | 7 | 8 | 9 |
|---|---|---|---|---|---|---|
| 0 | 0 | 0 | 0 | 0 | 0 | 0 |
| 15 | 0 | 0 | 0 | 0 | 0 | 0 |
| 30 | 0 | 0 | 0 | 0 | 0 | 0 |
| 45 | 7 | 5 | 7 | 7 | 7 | 5 |
| 60 | 9 | 7 | 9 | 9 | 9 | 7 |
| 75 | 10 | 10 | 10 | 10 | 10 | 10 |

The results in Tables IV and V show that the β-diketone, stearoyl benzoyl methane, contributes no noticeable improvement to heat stability at 350° and 375° F.

Samples also were placed in a Geer oven and held at 215° F. for up to seven days to simulate the moderate temperatures experienced by a motor vehicle component in a motor vehicle such as an automobile, with the following results:

TABLE VI

| | Color Rating at 215° F. | | | | | |
| | Controls | | Examples | | | |
| Time (days) | 1 | 2 | 6 | 7 | 8 | 9 |
|---|---|---|---|---|---|---|
| 0 | 0 | 0 | 0 | 0 | 0 | 0 |
| 1 | 0 | 0 | 0 | 0 | 0 | 0 |
| 2 | 1 | 1 | 0 | 0 | 0 | 0 |
| 3 | 1 | 1 | 0 | 0 | 0 | 0 |
| 4 | 2 | 2 | 0 | 0 | 0 | 0 |
| 5 | 2 | 2 | 0 | 1 | 1 | 1 |
| 6 | 3 | 3 | 0 | 1 | 1 | 1 |
| 7 | 3 | 3 | 0 | 1 | 1 | 1 |

The β-diketone, stearoyl benzoyl methane, clearly improves stability at 215° F. after heat processing, as evidenced by comparison of Controls 1 and 2 with Examples 6 to 9.

EXAMPLE 10

Polyvinyl chloride resin compositions were made up having the following formulation:

| Ingredient | Parts by Weight | |
|---|---|---|
| Polyvinyl chloride homopolymer | 100 | |
| Dioctyl phthalate | 50 | |
| Drapex 6.8 (epoxidized soybean oil) | 5 | |
| Calcium carbonate | 20 | |
| Stearic acid | 0.3 | |
| Stabilizer | 3.0 | |
| Stabilizer composed of: | Control | Example 10 |
| Diphenyl isodecyl phosphite | 40 | 40 |
| Isooctyl thioglycolate trithiophosphite | 10 | 10 |
| Diphenyl phosphite | 4 | 4 |
| Antioxidant | 4 | 4 |
| Barium nonyl phenate-barium carbonate | 28 | 28 |
| Zinc chloride phenyl diisodecyl phosphite | 18 | 18 |
| Stearoyl benzoyl methane | — | 1.0 |

The stabilizer system and other ingredients (dioctyl phthalate, epoxidized soybean oil, calcium carbonate and stearic acid) were blended with the polyvinyl chloride resin on a two-roll mill, and then sheeted off. Samples were cut off from the sheet and heated in a Geer oven at 350° F. and 375° F. for up to two hours. Samples were withdrawn at fifteen minute intervals to follow the progress of any deterioration as evidenced by discoloration and/or embrittlement. Deterioration was rated according to the scale of Examples 1 to 5. The results are shown in Tables VII to IX.

TABLE VII

| | Color Rating at 350° F. | |
| Time (minutes) | Control | Example 10 |
|---|---|---|
| 0 | 0 | 0 |
| 15 | 0 | 0 |
| 30 | 0 | 0 |
| 45 | 0 | 0 |
| 60 | 1 | 1 |
| 75 | 2 | 2 |
| 90 | 3 | 3 |
| 105 | 4 | 4 |
| 120 | 5 | 5 |

TABLE VIII

| | Color Rating at 375° F. | |
| Time (minutes) | Control | Example 10 |
|---|---|---|
| 0 | 0 | 0 |
| 15 | 0 | 0 |
| 30 | 1 | 1 |
| 45 | 2 | 2 |
| 60 | 2 | 2 |
| 75 | 3 | 3 |
| 90 | 4 | 4 |
| 105 | 5 | 5 |
| 120 | 7 | 7 |

The results in Tables VII and VIII show that the β-diketone, stearoyl benzoyl methane, contributes no noticeable improvement to heat stability at 350° and 375° F.

Samples also were placed in a Geer oven and held at 215° F. for up to seven days to simulate the moderate temperatures experienced by a motor vehicle component in a motor vehicle such as an automobile, with the following results:

TABLE IX

| | Color Rating at 215° F. | |
| Time(days) | Example 10 | Control |
|---|---|---|
| 0 | 0 | 0 |
| 1 | 0 | 0 |
| 2 | 0 | 1 |
| 3 | 0 | 1 |
| 4 | 0 | 2 |
| 5 | 0 | 3 |
| 6 | 1 | 4 |
| 7 | 2 | 4 |

The β-diketone, stearoyl benzoyl methane, clearly improves stability at 215° F. after heat processing, as evidenced by comparison of the Control with Example 10.

EXAMPLES 11 to 14

Polyvinyl chloride resin compositions were made up having the following formulation:

| Ingredient | Parts by Weight |
|---|---|
| Polyvinyl chloride homopolymer (Oxy 9400) | 100 |
| Santicizer 711 (mixed C7-C11 alkyl phthalate) | 30 |
| Drapex 6.8 (epoxidized soybean oil) | 5.0 |
| Omyalite 90T (calcium carbonate) | 15 |
| Loxol GT-71 (fatty ester lubricant) | 0.25 |
| Microcheck 11D (fungicide) | 3.0 |
| TiO$_2$ (R101) | 0.25 |

-continued

| Ingredient | Parts by Weight | | | |
|---|---|---|---|---|
| Dibenzoyl methane | 0.3 | | | |
| Stabilizer | 2.5 | | | |

| | Examples | | | |
|---|---|---|---|---|
| Stabilizer composed of: | 11 | 12 | 13 | 14 |
| Barium nonyl phenate solution 50% (12.5% Ba) | 14.7 | 17.6 | — | — |
| Ba nonyl phenate-Ba 2-ethyl hexoate (12% Ba) | 14.7 | 17.6 | — | — |
| Ba nonyl phenate-BaCO₃ (27% Ba) | — | — | 24.9 | 28 |
| Zinc 2-ethyl hexoate (22% Zn) | 1.3 | 1.6 | 2.7 | — |
| Cd benzoate tallate solution (14% Cd) | 33.3 | 20.0 | — | — |
| Cd 2-ethyl hexoate benzoate tallate solution (14% Cd) | 14.7 | 17.6 | — | — |
| Cd 2-ethyl hexoate (10% Cd) in PDDP | — | — | 41.2 | — |
| Diphenyl isodecyl phosphite | 14.5 | 17.4 | — | 40 |
| Phenyl diisodecyl phosphite (PDDP) | — | — | 21.2 | — |
| Triphenyl phosphite | 3.2 | 3.8 | — | — |
| Diphenyl phosphite | 0.31 | 1.6 | 3 | 4 |
| ZnCl₂·phenyl diisodecyl phosphite | — | — | — | 18 |
| Isooctyl thioglycolate trithiophosphite | — | — | — | 10 |
| Oleic acid | — | 0.8 | 0.6 | — |
| Mineral spirits | 1.4 | 0.85 | 5 | — |
| Cinnamic acid | — | 0.75 | 0.35 | — |
| Antioxidant | 1.0 | 0.4 | 1 | 4 |
| Dibenzoyl methane | 12.0 | 12.0 | 12.0 | 12.5 |

In addition, four Controls were made up exactly like Examples 11, 12, 13 and 14, but without the dibenzoyl methane.

The stabilizer system and other ingredients were blended with the polyvinyl chloride resin on a two-roll mill and then sheeted off. Samples were cut off from the sheets and heated in a Geer oven at 350° F. and 375° F. for up to two hours. Samples were withdrawn at fifteen minute intervals and their appearance observed according to the color rating chart of Examples 1 to 5. The results are shown in Tables X and XI.

TABLE X

| | Color Rating at 350° F. | | | | | | | |
|---|---|---|---|---|---|---|---|---|
| | Controls | | | | Examples | | | |
| Time (minutes) | 1 | 2 | 3 | 4 | 11 | 12 | 13 | 14 |
| 0 | 0 | 0 | 0 | 0 | 0 | 0 | 0 | 0 |
| 15 | 0 | 0 | 0 | 0 | 0 | 0 | 0 | 0 |
| 30 | 0 | 0 | 0 | 0 | 0 | 0 | 0 | 0 |
| 45 | 0 | 0 | 0 | 0 | 0 | 0 | 0 | 0 |
| 60 | 0 | 0 | 1 | 1 | 0 | 0 | 0 | 0 |
| 75 | 0 | 0 | 1 | 1 | 0 | 0 | 0 | 0 |
| 90 | 1 | 1 | 2 | 2 | 1 | 1 | 1 | 1 |
| 105 | 1 | 1 | 2 | 2 | 1 | 1 | 1 | 1 |
| 120 | 1 | 1 | 2 | 2 | 1 | 1 | 1 | 2 |

TABLE XI

| | Color Rating at 375° F. | | | | | | | |
|---|---|---|---|---|---|---|---|---|
| | Controls | | | | Examples | | | |
| Time (minutes) | 1 | 2 | 3 | 4 | 11 | 12 | 13 | 14 |
| 0 | 0 | 0 | 0 | 0 | 0 | 0 | 0 | 0 |
| 15 | 0 | 0 | 0 | 0 | 0 | 0 | 0 | 0 |
| 30 | 0 | 0 | 0 | 1 | 0 | 0 | 0 | 0 |
| 45 | 0 | 0 | 0 | 1 | 0 | 0 | 0 | 0 |
| 60 | 1 | 1 | 1 | 2 | 1 | 1 | 0 | 1 |
| 75 | 3 | 3 | 3 | 3 | 2 | 2 | 1 | 2 |
| 90 | 5 | 5 | 5 | 4 | 3 | 3 | 3 | 4 |
| 105 | 7 | 7 | 7 | 5 | 5 | 5 | 5 | 5 |
| 120 | 8 | 8 | 8 | 7 | 7 | 7 | 7 | 7 |

The dibenzoyl methane clearly contributes no noticeable effect on heat stability at 350° and 375° F.

Samples also were placed in a Geer oven and held at 215° F. for up to seven days to simulate the moderate temperatures experienced by a motor vehicle component in a motor vehicle, such as an automobile, with the following results:

TABLE XII

| | Color Rating at 215° F. | | | | | | | |
|---|---|---|---|---|---|---|---|---|
| | Controls | | | | Examples | | | |
| Time (days) | 1 | 2 | 3 | 4 | 11 | 12 | 13 | 14 |
| 0 | 0 | 0 | 0 | 0 | 0 | 0 | 0 | 0 |
| 1 | 1 | 1 | 1 | 1 | 0 | 0 | 0 | 0 |
| 2 | 1 | 1 | 2 | 2 | 0 | 0 | 0 | 0 |
| 3 | 2 | 2 | 3 | 3 | 0 | 0 | 0 | 0 |
| 4 | 3 | 3 | 4 | 4 | 0 | 0 | 0 | 0 |
| 5 | 4 | 4 | 5 | 5 | 0 | 0 | 1 | 1 |
| 6 | 5 | 5 | 6 | 5 | 1 | 1 | 2 | 2 |
| 7 | 6 | 6 | 7 | 6 | 2 | 2 | 3 | 3 |

The β-diketone, dibenzoyl methane, markedly improves stability at moderate temperatures after heat processing.

On the other hand, the β-diketone has no noticeable effect on stability at low temperatures of the order of 120° F. (50° C). This is shown by exposure to fluorescent light in a QUV fluorescent bulb weathering device, operating at 120° F. (50° C.) in a 4 hour cycle, with the lights on 4 hours and then off 4 hours, for up 16 days. The samples so exposed gave the following results:

TABLE XIII

| | QUV Exposure at 120° F. | | | | | | | |
|---|---|---|---|---|---|---|---|---|
| | Controls | | | | Examples | | | |
| Time (hours) | 1 | 2 | 3 | 4 | 11 | 12 | 13 | 14 |
| 0 | 0 | 0 | 0 | 0 | 0 | 0 | 0 | 0 |
| 118 | 1 | 1 | 1 | 1 | 1 | 1 | 1 | 1 |
| 283 | 2 | 2 | 2 | 2 | 2 | 2 | 2 | 2 |
| 379 | 2 | 2 | 2 | 2 | 2 | 2 | 2 | 2 |

EXAMPLES 15 to 17

Polyvinyl chloride resin compositions were made up having the following formulation:

| Ingredient | Parts by Weight |
|---|---|
| Polyvinyl chloride homopolymer (Tenneco 225) | 100 |
| Santicizer 711 (mixed C7-C11 alkyl phthalate plasticizer) | 30 |
| Drapex 6.8 epoxidized soybean oil | 4.5 |
| 2-hydroxy-4-n-octoxy benzophenone | 1.0 |
| Stearic acid | 0.25 |
| Stabilizer | 3.0 |

| | | Examples | | |
|---|---|---|---|---|
| Stabilizer composed of: | Control | 15 | 16 | 17 |
| Barium nonyl phenate BaCO₃ (27% Ba) | 3.92 | 16 | 16 | 16 |
| Barium nonyl phenate | 24.81 | — | — | — |
| Cd 2-ethyl-hexoate (20% Cd) | 3.92 | — | — | — |
| Cd benzoate-2-ethyl hexoate tallate (14% Cd) | 43.1 | 50 | 50 | 50 |

-continued

| Ingredient | Parts by Weight | | | |
|---|---|---|---|---|
| Zn.2-ethyl hexoate | 1.3 | 1.5 | 1.5 | 1.5 |
| Diphenyl phosphite | 4 | 4 | 4 | 4 |
| Diphenyl isodecyl phosphite | 17 | 17 | 17 | 17 |
| Oleic acid | 0.67 | — | — | — |
| Cinnamic acid | 0.4 | 0.5 | 0.5 | 0.5 |
| Antioxidant | 1.0 | — | — | — |
| Dibenzoyl methane | — | 2.5 | 5.0 | 7.5 |
| Hydrocarbon diluent | — | 8.5 | 6.0 | 3.5 |

The stabilizer system and other ingredients were blended with the polyvinyl chloride resin on a two-roll mill, and then sheeted off. Samples were cut off from the sheets and heated in a Geer oven at 350° F. and 375° F. for up to two hours. Samples were withdrawn at fifteen minute intervals, and the discoloration rated according to the scale in Examples 1 to 5. The results are shown in Tables XIV and XV.

TABLE XIV

| | Color Rating at 350° F. | | | |
|---|---|---|---|---|
| | | Examples | | |
| Time (minutes) | Control | 15 | 16 | 17 |
| 0 | 0 | 0 | 0 | 0 |
| 15 | 0 | 0 | 0 | 0 |
| 30 | 0 | 0 | 0 | 0 |
| 45 | 0 | 0 | 0 | 0 |
| 60 | 0 | 0 | 0 | 0 |
| 75 | 0 | 0 | 0 | 0 |
| 90 | 1 | 1 | 1 | 1 |
| 105 | 1 | 1 | 1 | 1 |
| 120 | 2 | 2 | 2 | 2 |

TABLE XV

| | Color Rating at 375° F. | | | |
|---|---|---|---|---|
| | | Examples | | |
| Time (minutes) | Control | 15 | 16 | 17 |
| 0 | 0 | 0 | 0 | 0 |
| 15 | 0 | 0 | 0 | 0 |
| 30 | 0 | 0 | 0 | 0 |
| 45 | 1 | 1 | 1 | 1 |
| 60 | 1 | 1 | 1 | 1 |
| 75 | 2 | 2 | 2 | 2 |
| 90 | 3 | 3 | 3 | 4 |
| 105 | 5 | 5 | 5 | 6 |
| 120 | 7 | 7 | 7 | 8 |

The β-diketone, dibenzoyl methane, clearly does not contribute to heat stability at 350° or 375° F.

A plate-out test was run on all four resin compositions. Red pigment was added to the composition and the mix milled on the two-roll mill for five minutes at 325° F., and sheeted off. The clean-up sheet run thereafter was exactly the same in all four cases, showing the β-diketone had no effect.

Thick press-polished panels were prepared from each composition, and were indistinguishable, one from the other, again showing the β-diketone had no effect.

Samples also were placed in a Geer oven and held at 215° F. for up to fourteen days, to simulate the moderate temperatures experienced by motor vehicle components in a motor vehicle such as an automobile, with the following results:

TABLE XVI

| | Color Rating at 215° F. | | | |
|---|---|---|---|---|
| | | Examples | | |
| Time (days) | Control | 15 | 16 | 17 |
| 0 | 0 | 0 | 0 | 0 |

TABLE XVI-continued

| | Color Rating at 215° F. | | | |
|---|---|---|---|---|
| | | Examples | | |
| Time (days) | Control | 15 | 16 | 17 |
| 1 | 0 | 0 | 0 | 0 |
| 2 | 0 | 0 | 0 | 0 |
| 3 | 1 | 0 | 0 | 0 |
| 4 | 1 | 0 | 0 | 0 |
| 5 | 1 | 0 | 0 | 0 |
| 6 | 2 | 0 | 0 | 0 |
| 7 | 2 | 1 | 1 | 1 |
| 8 | 3 | 1 | 1 | 1 |
| 9 | 3 | 1 | 1 | 1 |
| 10 | 3 | 1 | 1 | 1 |
| 11 | 4 | 1 | 1 | 1 |
| 12 | 4 | 2 | 2 | 2 |
| 13 | 5 | 2 | 2 | 2 |
| 14 | 5 | 2 | 2 | 2 |

The β-diketone clearly improves resistance to discoloration at 215° F. after heat-processing.

EXAMPLE 18

Polyvinyl chloride resin compositions were made up having the following formulation:

| Ingredient | Parts by Weight | |
|---|---|---|
| Polyvinyl chloride homopolymer (Tenneco 225) | 100 | |
| Santicizer 711 (mixed C7-C11 alkyl phthalate plasticizer) | 30 | |
| Drapex 6.8 epoxidized soybean oil | 4 | |
| Blue dye | 0.01 | |
| Stearic acid | 0.25 | |
| Stabilizer | 3.0 | |
| Stabilizer composed of: | Control | Example 18 |
| Barium nonyl phenate BaCO₃ (27% Ba) | 32.5 | 16 |
| Cd 2-ethyl-hexoate (20% Cd) | — | 50 |
| Cd benzoate-2-ethyl hexoate tallate (14% Cd) | 27.4 | — |
| Zn.2-ethyl hexoate (22% Zn) | 3.1 | 1.5 |
| Diphenyl phosphite | 1.6 | 4 |
| Diphenyl isodecyl phosphite | — | 17 |
| Diphenyl 2-ethyl hexyl phosphite | 35.0 | — |
| Cinnamic acid | — | 0.5 |
| Mineral Spirits | — | 8.5 |
| Dibenzoyl methane | — | 2.5 |

The stabilizer system and other ingredients were blended with the polyvinyl chloride resin on a two-roll mill, and then sheeted off.

Blue-tinted convertible rear window press-polished panels were preparation from each composition, and clippings taken from each were placed in a Geer oven and held at 215° F. for up to fourteen days, to simulate the moderate temperatures experienced by such rear windows when installed in an automobile, with the following results:

TABLE XVII

| | Color at 215° F. | |
|---|---|---|
| Time (days) | Control | Example 18 |
| 0 | Blue | Blue |
| 1 | Unchanged | Unchanged |
| 2 | Faded Blue | Unchanged |
| 3 | Barely Perceptible Blue Tint | Unchanged |
| 4 | Light Gray | Unchanged |
| 5 | Gray Tan | Faded Blue |
| 6 | Light Tan | Faded Blue |
| 7 | Light Tan | Faded Blue |

TABLE XVII-continued

| | Color at 215° F. | |
|---|---|---|
| Time (days) | Control | Example 18 |
| 8 | Light Tan | Faded Blue |
| 9 | Light Tan | Barely Perceptible Blue Tint |
| 10 | Medium Tan | Barely Perceptible Blue Tint |
| 11 | Medium Tan | Light Gray |
| 12 | Dark Tan | Light Gray |
| 13 | Dark Tan | Gray Tan |
| 14 | Dark Tan | Gray Tan |

The $\beta$-diketone clearly improves resistance to discoloration at 215° F. after heat-processing.

EXAMPLE 19

Polyvinyl chloride resin compositions were made up having the following formulation:

| Ingredient | Parts by Weight | |
|---|---|---|
| Polyvinyl chloride homopolymer (Tenneco 225) | 100 | |
| Santicizer 711 (mixed C7-C11 alkyl phthalate plasticizer) | 35 | |
| Drapex 6.8 epoxidized soybean oil | 5 | |
| Atomite (CaCO₃) | 20 | |
| Stearic acid | 0.25 | |
| Stabilizer | 2.5 | |

| Stabilizer composed of: | Control | Example 19 |
|---|---|---|
| Barium nonyl phenate BaCO₃ (27% Ba) | 32.5 | 16 |
| Cd 2-ethyl-hexoate (20% Cd) | 27.4 | 50 |
| Cd benzoate-2-ethyl hexoate Tallate (14% Cd) | — | — |
| Zn 2-ethyl hexoate | 3.1 | 1.5 |
| Diphenyl phosphite | 1.6 | 4 |
| Diphenyl isodecyl phosphite | — | 17 |
| Diphenyl 2-ethyl hexyl phosphite | 35 | — |
| Cinnamic acid | — | 0.5 |
| Mineral Spirits | — | 8.5 |
| Dibenzoyl methane | — | 2.5 |

The stabilizer system and other ingredients were blended with the polyvinyl chloride resin on a two-roll mill, and then sheeted off. Samples were cut off from the sheets and heated in a Geer oven at 350° F. and 375° F. for up to two hours. Samples were withdrawn at fifteen minute intervals, and the discoloration rated according to the scale in Examples 1 to 5. The results are shown in Tables XVII and XIX.

TABLE XVIII

| | Color Rating at 350° F. | |
|---|---|---|
| Time (minutes) | Control | Example 19 |
| 0 | 0 | 0 |
| 15 | 0 | 0 |
| 30 | 0 | 0 |
| 45 | 0 | 0 |
| 60 | 0 | 0 |
| 75 | 0 | 0 |
| 90 | 1 | 1 |
| 105 | 1 | 1 |
| 120 | 2 | 2 |

TABLE XIX

| | Color Rating at 375° F. | |
|---|---|---|
| Time (minutes) | Control | Example 19 |
| 0 | 0 | 0 |
| 15 | 0 | 0 |

TABLE XIX-continued

| | Color Rating at 375° F. | |
|---|---|---|
| Time (minutes) | Control | Example 19 |
| 30 | 0 | 0 |
| 45 | 1 | 1 |
| 60 | 1 | 1 |
| 75 | 2 | 2 |
| 90 | 3 | 3 |
| 105 | 5 | 5 |
| 120 | 7 | 7 |

The $\beta$-diketone, dibenzoyl methane, clearly does not contribute to heat stability at 350° or 375° F.

Glove compartment boxes were prepared from each composition. The boxes were placed in a Geer oven and held at 215° F. for up to fourteen days, to simulate the moderate temperatures experienced by such components in an automobile, with the following results:

TABLE XX

| | Color at 215° F. | |
|---|---|---|
| Time (days) | Control | Example 19 |
| 0 | White | White |
| 1 | Unchanged | Unchanged |
| 2 | Unchanged | Unchanged |
| 3 | Dirty White | Unchanged |
| 4 | Dirty White | Unchanged |
| 5 | Light Tan | Unchanged |
| 6 | Light Tan | Unchanged |
| 7 | Light Tan | Dirty White |
| 8 | Medium Tan | Dirty White |
| 9 | Medium Tan | Dirty White |
| 10 | Medium Tan | Dirty White |
| 11 | Dark Tan | Dirty White |
| 12 | Dark Tan | Dirty White |
| 13 | Dark Tan | Light Tan |
| 14 | Dark Tan | Light Tan |

The $\beta$-diketone clearly improves resistance to discoloration at 215° F. after heat-processing.

EXAMPLES 20 to 24

Polyvinyl chloride resin compositions were made up having the following formulation:

| Ingredient | Parts by Weight |
|---|---|
| Polyvinyl chloride homopolymer (Oxy 9400) | 100 |
| Santicizer 711 (mixed C7-C11 alkyl phthalate) | 30 |
| Drapex 6.8 (epoxidized soybean oil) | 5.0 |
| Omyalite 90T (CaCO₃) | 15 |
| Loxiol GT-71 (fatty ester lubricant) | 0.25 |
| Microcheck 11D (fungicide) | 3.0 |
| TiO₂ (R101) | 0.25 |
| Heat stabilizer | 2.5 |

| | Controls | | Examples | | | | |
|---|---|---|---|---|---|---|---|
| | 1 | 2 | 20 | 21 | 22 | 23 | 24 |
| Heat stabilizer composed of: | | | | | | | |
| Ba nonyl phenate-BaCO₃ (27% Ba) | 24.9 | 24.9 | 24.9 | 24.9 | 24.9 | 24.9 | 24.9 |
| Zinc 2-ethyl hexoate (22% Zn) | 2.7 | 2.7 | 2.7 | 2.7 | 2.7 | 2.7 | 2.7 |
| Cd 2-ethyl hexoate (10% Cd) | 41.2 | 41.2 | 41.2 | 41.2 | 41.2 | 41.2 | 41.2 |
| Phenyl diisodecyl phosphite | 21.2 | 21.2 | 21.2 | 21.2 | 21.2 | 21.2 | 21.2 |
| Diphenyl phosphite | 3 | 3 | 3 | 3 | 3 | 3 | 3 |
| Oleic acid | 0.6 | 0.6 | 0.6 | 0.6 | 0.6 | 0.6 | 0.6 |
| Mineral spirits | 5 | 5 | 5 | 5 | 5 | 5 | 5 |
| Cinnamic acid | 0.35 | 0.35 | 0.35 | 0.35 | 0.35 | 0.35 | 0.35 |
| Antioxidant | 1 | 1 | 1 | 1 | 1 | 1 | 1 |

-continued

| Parts by Weight per 100 Parts of Polymer |
| --- |

| Other Stabilizers added separately | Controls | | Examples | | | | |
| --- | --- | --- | --- | --- | --- | --- | --- |
| | 1 | 2 | 20 | 21 | 22 | 23 | 24 |
| 2-Hydroxy-4-octyl-oxybenzophenone | 0.5 | 2.5 | 0.5 | 0.5 | 1.0 | 0.5 | 0.5 |
| Stearoyl benzoyl methane | — | 0.2 | 0.5 | — | — | 0.5 | 0.5 |
| Dibenzoyl methane | — | — | — | 0.2 | 0.5 | — | — |

The stabilizer system and other ingredients were blended with the polyvinyl chloride resin on a two-roll mill and then sheeted off. Samples were cut off from the sheets and heated in a Geer oven at 350° F. and 375° F. for up to two hours. Samples were withdrawn at fifteen minute intervals and their appearance observed according to the color rating chart of Examples 1 to 5. The results are shown in Tables XIX and XX.

TABLE XXI

| | Color Rating at 350° F. | | | | | | |
| --- | --- | --- | --- | --- | --- | --- | --- |
| | Controls | | Examples | | | | |
| Time (minutes) | 1 | 2 | 20 | 21 | 22 | 23 | 24 |
| 0 | 0 | 0 | 0 | 0 | 0 | 0 | 0 |
| 15 | 0 | 0 | 0 | 0 | 0 | 0 | 0 |
| 30 | 0 | 0 | 0 | 0 | 0 | 0 | 0 |
| 45 | 0 | 0 | 0 | 0 | 0 | 0 | 0 |
| 60 | 0 | 0 | 0 | 0 | 0 | 0 | 0 |
| 75 | 0 | 0 | 0 | 0 | 0 | 0 | 0 |
| 90 | 1 | 1 | 1 | 1 | 1 | 1 | 1 |
| 105 | 1 | 1 | 1 | 1 | 1 | 1 | 1 |
| 120 | 1 | 1 | 1 | 1 | 1 | 1 | 1 |

TABLE XXII

| | Color Rating at 375° F. | | | | | | |
| --- | --- | --- | --- | --- | --- | --- | --- |
| | Controls | | Examples | | | | |
| Time (minutes) | 1 | 2 | 20 | 21 | 22 | 23 | 24 |
| 0 | 0 | 0 | 0 | 0 | 0 | 0 | 0 |
| 15 | 0 | 0 | 0 | 0 | 0 | 0 | 0 |
| 30 | 0 | 0 | 0 | 0 | 0 | 0 | 0 |
| 45 | 0 | 0 | 0 | 0 | 0 | 0 | 0 |
| 60 | 0 | 0 | 0 | 0 | 0 | 0 | 0 |
| 75 | 0 | 0 | 0 | 0 | 0 | 0 | 0 |
| 90 | 1 | 1 | 1 | 1 | 1 | 1 | 1 |
| 105 | 1 | 1 | 1 | 1 | 1 | 1 | 1 |
| 120 | 1 | 1 | 1 | 1 | 1 | 1 | 1 |

The dibenzoyl methane clearly contributes no noticeable effect on heat stability at 350° and 375° F.

Samples also were placed in a Geer oven and held at 250° F. for up to seven days to simulate the moderate temperatures experienced by a motor vehicle component in a motor vehicle, such as an automobile, with the following results:

TABLE XXIII

| | Color at 250° F. | | | | | | |
| --- | --- | --- | --- | --- | --- | --- | --- |
| | Controls | | Examples | | | | |
| Time (days) | 1 | 2 | 20 | 21 | 22 | 23 | 24 |
| 0 | White | White | White | White | White | White | White |
| 1 | Pink | Off White | White | White | White | White | White |
| 2 | Tan | Tan | Pink | Off White | Off White | Off White | Off White |
| 3 | Tan | Tan | Pink | Off White | Off White | Off White | Pink |
| 4 | Tan | Tan | Pink | Pink | Pink | Off White | Pink |
| 5 | Dark Tan | Tan | Pink | Pink | Pink | Pink | Pink |
| 6 | Dark Tan | Tan | Pink | Pink | Pink | Pink | Pink |
| 7 | Dark Tan | Tan | Tan | Pink | Pink | Pink | Pink |

The β-diketones dibenzoyl methane and stearoyl dibenzoyl methane markedly improve stability at moderate temperatures after heat processing.

EXAMPLE 25

Polyvinyl chloride resin compositions were made up having the following formulation:

| Ingredient | Parts by Weight | |
| --- | --- | --- |
| Polyvinyl chloride homopolymer (Oxy 9400) | 100 | |
| Santicizer 711 (mixed C7-C11 alkyl phthalate) | 30 | |
| Drapex 6.8 (epoxidized soybean oil) | 5.0 | |
| Omyalite 90T (CaCO3) | 15 | |
| Lorol GT-71 (fatty ester lubricant) | 0.25 | |
| TiO2 (R101) | 0.25 | |
| Stabilizer | 2.5 | |
| Stabilizer composed of: | Control | Example 25 |
| Ba nonyl phenate-BaCO3 (27% Ba) | 21 | 21 |
| Zinc 2-ethyl hexoate (22% Zn) | 4.6 | 4.6 |
| Cd 2-ethyl hexoate benzoate tallate solution (14% Cd) | 17 | 17 |
| Diphenyl isodecyl phosphite | 35 | 35 |
| Diphenyl phosphite | 1.5 | 1.5 |
| Aromatic hydrocarbon diluent | 15.9 | 10.9 |
| Tall oil fatty acid | 3 | 3 |
| Antioxidant | 2 | 2 |
| Dibenzoyl methane | — | 5 |

The stabilizer system and other ingredients were blended with the polyvinyl chloride resin on a two-roll mill and the sheeted off. Samples were cut off from the sheets and heated in a Geer oven at 350° F. and 375° F. for up to two hours. Samples were withdrawn at fifteen minute intervals and their appearance observed according to the color rating chart of Examples 1 to 5. The results are shown in Tables XXIV and XXV.

TABLE XXIV

| | Color Rating at 350° F. | |
| --- | --- | --- |
| Time (minutes) | Control | Example 25 |
| 0 | 0 | 0 |
| 15 | 0 | 0 |

TABLE XXIV-continued

| | Color Rating at 350° F. | |
|---|---|---|
| Time (minutes) | Control | Example 25 |
| 30 | 0 | 0 |
| 45 | 0 | 0 |
| 60 | 0 | 0 |
| 75 | 0 | 0 |
| 90 | 1 | 1 |
| 105 | 1 | 1 |
| 120 | 1 | 1 |

TABLE XXV

| | Color Rating at 375° F. | |
|---|---|---|
| Time (minutes) | Control | Example 25 |
| 0 | 0 | 0 |
| 15 | 0 | 0 |
| 30 | 0 | 0 |
| 45 | 0 | 0 |
| 60 | 0 | 0 |
| 75 | 0 | 0 |
| 90 | 1 | 1 |
| 105 | 2 | 2 |
| 120 | 3 | 3 |

The dibenzoyl methane clearly contributes no noticeable effect on heat stability at 350° and 375° F.

Samples also were placed in a Geer oven and held at 250° F. for up to eight days to simulate the moderate temperatures experienced by a motor vehicle component in a motor vehicle, such as an automobile, with the following results;

TABLE XXVI

| | Color at 250° F. | |
|---|---|---|
| Time (days) | Control | Example 25 |
| 0 | White | White |
| 1 | Off White | White |
| 2 | Light Tan | Off White |
| 3 | Light Tan | Off White |
| 4 | Light Tan | Off White |
| 5 | Tan | Light Tan |
| 6 | Dark Tan | Dark Tan |
| 7 | Dark Tan | Dark Tan |
| 8 | Dark Tan | Dark Tan |

The β-diketone, dibenzoyl methane, markedly improves stability at moderate temperatures after heat processing.

EXAMPLE 26

Polyvinyl chloride resin compositions were made up having the following formulation:

| Ingredient | Parts by Weight | |
|---|---|---|
| Polyvinyl chloride homopolymer (Oxy 9400) | 100 | |
| Santicizer 711 (mixed C7-C11 alkyl phthalate) | 30 | |
| Drapex 6.8 (epoxidized soybean oil) | 5.0 | |
| Omyalite 90T (CaCO3) | 15 | |
| Lorol GT-71 (fatty ester lubricant) | 0.25 | |
| TiO2 (R101) | 0.25 | |
| Stabilizer | 2.5 | |

| Stabilizer composed of: | Control | Example 26 |
|---|---|---|
| Barium nonyl phenate solvent (50%) (12.5% Ba) | 14.7 | — |
| Ba nonyl phenate-Ba 2-ethyl hexoate (12.5% Ba) | 14.7 | 14.66 |
| Ba nonyl phenate-BaCO3 (27% Ba) | — | 6.79 |
| Zinc 2-ethyl hexoate | 1.3 | 1.33 |
| (22% Zn) | | |
| Cd benzoate tallate solvent (14% Cd) | 33.3 | 33.3 |
| Cd 2-ethyl hexoate benzoate tallate (14% Cd) | 14.7 | 14.67 |
| Diphenyl isodecyl phosphite | 14.5 | 14.53 |
| Triphenyl phosphite | 3.2 | 3.3 |
| Diphenyl phosphite | 0.31 | 1.33 |
| Mineral spirits | 1.4 | 4.8 |
| Antioxidant | 1.0 | 0.33 |
| Dibenzoyl methane | — | 5.0 |

The stabilizer system and other ingredients were blended with the polyvinyl chloride resin on a two-roll mill and then sheeted off. Samples were cut off from the sheets and heated in a Geer oven at 350° F. and 375° F. for up to two hours. Samples were withdrawn at fifteen minute intervals and their appearance observed according to the color rating chart of Examples 1 to 5. The results are shown in Tables XXVII and XXVIII.

TABLE XXVII

| | Color Rating at 350° F. | |
|---|---|---|
| Time (minutes) | Control | Example 26 |
| 0 | 0 | 0 |
| 15 | 0 | 0 |
| 30 | 0 | 0 |
| 45 | 0 | 0 |
| 60 | 0 | 0 |
| 75 | 0 | 0 |
| 90 | 1 | 1 |
| 105 | 1 | 1 |
| 120 | 1 | 1 |

TABLE XXVIII

| | Color Rating at 375° F. | |
|---|---|---|
| Time (minutes) | Control | Example 26 |
| 0 | 0 | 0 |
| 15 | 0 | 0 |
| 30 | 0 | 0 |
| 45 | 0 | 0 |
| 60 | 0 | 0 |
| 75 | 0 | 0 |
| 90 | 1 | 1 |
| 105 | 1 | 1 |
| 120 | 1 | 1 |

The dibenzoyl methane clearly contributes no noticeable effect on heat stability at 350° and 375° F.

Samples also were placed in a Geer oven and held at 250° F. for up to eight days to simulate the moderate temperatures experienced by a motor vehicle component in a motor vehicle, such as an automobile, with the following results:

TABLE XXIX

| | Color at 250° F. | |
|---|---|---|
| Time (days) | Control | Example 26 |
| 0 | White | White |
| 1 | White | White |
| 2 | White | White |
| 3 | Off White | Off White |
| 4 | Light Tan | Off White |
| 5 | Light Tan | Off White |
| 6 | Tan | Light Tan |
| 7 | Tan | Light Tan |
| 8 | Tan | Light Tan |

The β-diketone, dibenzoyl methane, markedly improves stability at moderate temperatures after heat processing.

EXAMPLES 27 AND 28

Polyvinyl chloride resin compositions were made up having the following formulation:

| Ingredient | Parts by Weight |
|---|---|
| Polyvinyl chloride homopolymer (Tenneco 225) | 100 |
| Santicizer 711 (mixed C7-C11 alkyl phthalate plasticizer) | 35 |
| Drapex 6.8 epoxidized soybean oil | 5 |
| Atomite (CaCO$_3$) | 20 |
| Stearic acid | 0.25 |
| Stabilizer | 2.5 |

| Stabilizer composed of: | Control | Example 27 | Example 28 |
|---|---|---|---|
| Barium nonyl phenate BaCO$_3$ (27% Ba) | 3.92 | 16 | 16 |
| Barium nonyl phenate (12.5% Ba) | 24.81 | — | — |
| Cd 2-ethyl-hexoate (20% Cd) | 3.92 | — | — |
| Cd benzoate-2-ethyl hexoate tallate (14% Cd) | 43.1 | 50 | 50 |
| Zn.2-ethyl hexoate (22% Zn) | 1.3 | 1.5 | 1.5 |
| Diphenyl phosphite | 4 | 4 | 4 |
| Diphenyl isodecyl phosphite | 17 | 17 | 17 |
| Oleic acid | 0.67 | — | — |
| Cinnamic acid | 0.4 | 0.5 | 0.5 |
| Antioxidant | 1.0 | — | — |
| Dibenzoyl methane | — | 5.0 | 5.0 |
| Hydrocarbon diluent | — | 6.0 | 6.0 |
| Zinc chelate of dibenzoyl methane | — | — | 6.5 |

The zinc 2-ethyl hexoate and dibenzoyl methane formed the zinc chelate of dibenzoyl methane in situ.

The stabilizer system and other ingredients were blended with the polyvinyl chloride resin on a two-roll mill, and then sheeted off. Samples were cut off from the sheets and heated in a Geer oven at 350° F. and 375° F. for up to two hours. Samples were withdrawn at fifteen minute intervals, and the discoloration rated according to the scale in Examples 1 to 5. The results are shown in Tables XXX and XXXI.

TABLE XXX

| | Color Rating at 350° F. | | |
|---|---|---|---|
| Time (minutes) | Control | Example 27 | Example 28 |
| 0 | 0 | 0 | 0 |
| 15 | 0 | 0 | 0 |
| 30 | 0 | 0 | 0 |
| 45 | 0 | 0 | 0 |
| 60 | 0 | 0 | 0 |
| 75 | 0 | 0 | 0 |
| 90 | 1 | 1 | 1 |
| 105 | 1 | 1 | 1 |
| 120 | 2 | 2 | 2 |

TABLE XXXI

| | Color Rating at 375° F. | | |
|---|---|---|---|
| Time (minutes) | Control | Example 27 | Example 28 |
| 0 | 0 | 0 | 0 |
| 15 | 0 | 0 | 0 |
| 30 | 0 | 0 | 0 |
| 45 | 0 | 0 | 0 |
| 60 | 0 | 0 | 0 |
| 75 | 1 | 1 | 1 |
| 90 | 2 | 2 | 2 |
| 105 | 2 | 2 | 2 |
| 120 | 3 | 3 | 3 |

The zinc chelate of the β-diketone, dibenzoyl methane, clearly does not contribute to heat stability at 350° or 375° F.

A plate-out test was run on all four resin compositions. Red pigment was added to the composition and the mix milled on the two-roll mill for five minutes at 325° F., and sheeted off. The clean-up sheet run thereafter was exactly the same in all four cases, showing the zinc chelate of the β-diketone had no effect.

Thick press-polished panels were prepared from each composition, and were indistinguishable, one from the other, again showing the zinc chelate of the β-diketone had no effect.

Samples also were placed in a Geer oven and held at 215° F. for up to sixteen days, to simulate the moderate temperatures experienced by motor vehicle components in a motor vehicle such as an automobile, with the following results:

TABLE XXXII

| | Color Rating at 215° F. | | |
|---|---|---|---|
| Time (days) | Control | Example 27 | Example 28 |
| 0 | 0 | 0 | 0 |
| 1 | 0 | 0 | 0 |
| 2 | 0 | 0 | 0 |
| 3 | 0 | 0 | 0 |
| 4 | 1 | 0 | 0 |
| 5 | 1 | 0 | 0 |
| 6 | 2 | 0 | 0 |
| 7 | 2 | 1 | 1 |
| 8 | 3 | 1 | 1 |
| 9 | 3 | 1 | 1 |
| 10 | 3 | 1 | 1 |
| 11 | 4 | 1 | 1 |
| 12 | 4 | 2 | 2 |
| 13 | 5 | 2 | 2 |
| 14 | 5 | 2 | 2 |
| 15 | 5 | 2 | 2 |
| 16 | 5 | 2 | 2 |

The zinc chelate of dibenzoyl methane clearly improves resistance to discoloration at 215° F. after heat-processing.

A blue dye was then added with the stabilizer system and other ingredients of the polyvinyl chloride resin composition described above, and blended with the polyvinyl chloride resin on a two-roll mill, and then sheeted off.

Blue-tinted press-polished convertible rear window panels were prepared from each composition, and clippings taken from each were placed in a Geer oven and heated at 215° F. for up to sixteen days, to simulate the moderate temperatures experienced by such rear windows when installed in an automobile. The results were the same as in Table XXXII.

The Zn chelate of dibenzoyl methane clearly improved resistance to discoloration at 215° F. after heat-processing.

EXAMPLES 29 to 32

Polyvinyl chloride resin compositions were made up having the following formulation:

| Ingredient | Parts by Weight |
|---|---|
| Polyvinyl chloride homopolymer (Geon 110X 450) | 100 |
| Dioctyl phthalate | 40 |
| Drapex 6.8 epoxidized soybean oil | 5 |
| Atomite (CaCO$_3$) | 20 |
| Stearic acid | 0.2 |

-continued

| Stabilizer | | | 2.5 | | |
|---|---|---|---|---|---|
| | Control | Examples | | | |
| Stabilizer composed of: | | 29 | 30 | 31 | 32 |
| Barium nonyl phenate BaCO3 (27% Ba) | 3.92 | 3.92 | 16 | 16 | 16 |
| Barium nonyl phenate (12.5% Ba) | 24.81 | 24.81 | — | — | — |
| Cd 2-ethyl-hexoate (20% Cd) | 3.92 | 3.92 | — | — | — |
| Cd benzoate-2-ethyl hexoate tallate (14% Cd) | 43.1 | 43.1 | 50 | 50 | 50 |
| Zn.2-ethyl hexoate (22% Zn) | 1.3 | 1.3 | 1.5 | 1.5 | 1.5 |
| Diphenyl phosphite | 4 | 4 | 4 | 4 | 4 |
| Diphenyl isodecyl phosphite | 17 | 17 | 17 | 17 | 17 |
| Oleic acid | 0.67 | 0.67 | — | — | — |
| Cinnamic acid | 0.4 | 0.4 | 0.5 | 0.5 | 0.5 |
| Antioxidant | 1.0 | 1.0 | — | — | — |
| Dibenzoyl methane | — | — | 2.5 | — | — |
| Hydrocarbon diluent | — | — | 2.5 | 8.5 | 8.5 |
| Cadmium chelate of dibenzoyl methane | — | 0.1 | — | 2.5 | 4.0 |

The cadmium 2-ethyl hexoate and dibenzoyl methane formed the cadmium chelate of dibenzoyl methane in situ in Example 29.

The stabilizer system and other ingredients were blended with the polyvinyl chloride resin on a two-roll mill, and then sheeted off. Samples were cut off from the sheets and heated in a Geer oven at 350° F. and 375° F. for up to two hours. Samples were withdrawn at fifteen minute intervals, and the discoloration rated according to the scale in Examples 1 to 5. The results are shown in Tables XXXIII and XXXIV.

TABLE XXXIII

| | Color Rating at 350° F. | | | | |
|---|---|---|---|---|---|
| | | Examples | | | |
| Time (minutes) | Control | 29 | 30 | 31 | 32 |
| 0 | 0 | 0 | 0 | 0 | 0 |
| 15 | 0 | 0 | 0 | 0 | 0 |
| 30 | 0 | 0 | 0 | 0 | 0 |
| 45 | 0 | 0 | 0 | 0 | 0 |
| 60 | 0 | 0 | 0 | 0 | 0 |
| 75 | 0 | 0 | 0 | 0 | 0 |
| 90 | 1 | 1 | 1 | 1 | 1 |
| 105 | 1 | 1 | 1 | 1 | 1 |
| 120 | 2 | 2 | 2 | 2 | 2 |

TABLE XXXIV

| | Color Rating at 375° F. | | | | |
|---|---|---|---|---|---|
| | | Examples | | | |
| Time (minutes) | Control | 29 | 30 | 31 | 32 |
| 0 | 0 | 0 | 0 | 0 | 0 |
| 15 | 0 | 0 | 0 | 0 | 0 |
| 30 | 0 | 0 | 0 | 0 | 0 |
| 45 | 1 | 1 | 1 | 1 | 1 |
| 60 | 1 | 1 | 1 | 1 | 1 |
| 75 | 2 | 2 | 2 | 2 | 2 |
| 90 | 3 | 3 | 3 | 3 | 3 |
| 105 | 5 | 5 | 5 | 5 | 5 |
| 120 | 10 | 10 | 10 | 10 | 10 |

The cadmium chelate of dibenzoyl methane clearly does not contribute to heat stability at 350° or 375° F.

A plate-out test was run on all four resin compositions. Red pigment was added to the composition and the mix milled on the two-roll mill for five minutes at 325° F., and sheeted off. The clean-up sheet run thereafter was exactly the same in all four cases, showing the cadmium chelate of the β-diketone had no effect.

Thick press-polished panels were prepared from each composition, and were indistinguishable, one from the other, again showing the cadmium chelate of the β-diketone had no effect.

Samples also were placed in a Geer oven and held at 215° F. for up to fourteen days, to simulate the moderate temperatures experienced by motor vehicle components in a motor vehicle such as an automobile, with the following results:

TABLE XXXV

| | Color Rating at 215° F. | | | | |
|---|---|---|---|---|---|
| | | Examples | | | |
| Time (days) | Control | 29 | 30 | 31 | 32 |
| 0 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 1 | 0 | 0 | 0 | 1 |
| 5 | 1 | 0 | 0 | 0 | 1 |
| 6 | 2 | 0 | 0 | 0 | 1 |
| 7 | 2 | 1 | 1 | 1 | 1 |
| 8 | 3 | 2 | 1 | 1 | 1 |
| 9 | 4 | 2 | 1 | 1 | 1 |
| 10 | 5 | 3 | 1 | 1 | 1 |
| 11 | 6 | 4 | 1 | 1 | 1 |
| 12 | 6 | 4 | 1 | 1 | 1 |
| 13 | 7 | 4 | 1 | 1 | 1 |
| 14 | 7 | 5 | 1 | 1 | 1 |

The cadmium chelate of dibenzoyl methane clearly improves resistance to discoloration at 215° F. after heat-processing. Example 29 shows that even 0.1 chelate is helpful, but Examples 30 and 31 show that 2.5 and 4 of chelate are better.

A blue dye was then added with the stabilizer system and other ingredients of the polyvinyl chloride resin composition described above, and blended with the polyvinyl chloride resin on a two-roll mill, and then sheeted off.

Blue-tinted press-polished convertible rear window panels were prepared from each composition, and clippings taken from each were placed in a Geer oven and heated at 215° F. for up to sixteen days, to simulate the moderate temperatures experienced by such rear windows when installed in an automobile. The results were the same as in Table XXXV.

The cadmium chelate of dibenzoyl methane clearly improved resistance to discoloration at 215° F. after heat-processing.

Having regard to the foregoing disclosure the following is claimed as the inventive and patentable embodiments thereof:

1. A shaped motor vehicle component having an improved stability at moderate temperatures of from about 150° F. to about 280° F. (corresponding to about 65° C. to about 138° C.), composed of a polyvinyl chloride resin composition comprising a vinyl chloride polymer formed at least in part of the recurring group,

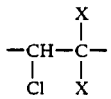

and having a chlorine content in excess of 40%, where X is either hydrogen or chlorine, at least one heat stabilizer in a sufficient amount to impart heat processing stability during shaping, and a β-diketone in a sufficient amount to provide, after shaping, stability at moderate temperatures not provided by any residual heat stabilizer, the β-diketone having the formula:

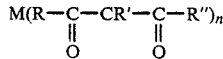

wherein M is a metal or hydrogen, n is the valence of M, R, R' and R" are selected from the group consisting of aliphatic having from eleven to eighteen carbon atoms, cycloaliphatic having from eleven to eighteen carbon atoms, and aromatic hydrocarbon, haloaromatichydrocarbon, alkoxyaromatic-hydrocarbon and alkylenedioxyaromatic hydrocarbon having from six to about eighteen carbon atoms, and from none to seven halogen atoms, and from none to two alkoxy or alkylenedioxyhydrocarbon groups, *provided*, that R' can also be hydrogen, and that only one of R and R" can be aliphatic or cycloaliphatic.

2. A shaped motor vehicle component according to claim 1, wherin M is hydrogen and the formula is

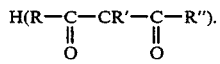

3. A shaped motor vehicle component according to claim 2, wherein the β-diketone is dibenzoylmethane.

4. A shaped motor vehicle component according to claim 2, wherein the β-diketone is stearoyl benzoyl methane.

5. A shaped motor vehicle component according to claim 1, wherein M is a metal and the formula is

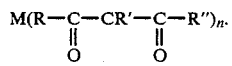

6. A shaped motor vehicle component according to claim 5, wherein the metal is selected from the group consisting of Li, Na, K, Mg, Ca, Sr, Ba, Zn, Al and Sb.

7. A shaped motor vehicle component according to claim 1, wherein both R and R" are aromatic and R' is hydrogen.

8. A shaped motor vehicle component according to claim 1, where R is aliphatic or cycoalipatic, R" is aromatic and R' is hydrogen.

9. A shaped motor vehicle component according to claim 1, in which the heat stabilizer is in a sufficient amount to improve the resistance of the polyvinyl chloride to deterioration in physical properties during heat processing, including discoloration, change in melt viscosity and embrittlement, within the range from about 0.001 to about 5% total heat stabilizers by weight of the polymer, and the β-diketone is in an amount to impart resistance to deterioration when exposed to moderate temperatures within the range from about 150° to about 280° F. after heat processing, including discoloration and embrittlement, within the range from about 0.001 to about 5% β-diketone by weight of the polymer.

10. A shaped motor vehicle component according to claim 1, in which the vinyl chloride polymer is polyvinyl chloride homopolymer.

11. A shaped motor vehicle component according to claim 1, in which the vinyl chloride polymer is a copolymer of vinyl chloride and another copolymerizable monomer.

12. A process for preparing a motor vehicle component having an improved stability at moderate temperatures of from about 150° F. to about 280° F. (corresponding to about 65° C. to about 138° C.), which comprises forming a vinyl chloride resin composition at a heat processing temperature within the range from about 300° to about 400° F. (corresponding to about 148° C. to 205° C.) in the selected shape, the composition comprising a vinyl chloride polymer formed at least in part of the recurring group,

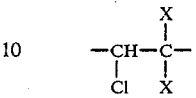

and having a chlorine content in excess of 40%, where X is either hydrogen or chlorine, at least one heat stabilizer in a sufficient amount to impart heat processing stability during shaping, and a β-diketone in a sufficient amount to provide, after shaping, stability at moderate temperatures not provided by any residual heat stabilizer, and then, after heat processing, exposing the shaped motor vehicle component to moderate temperatures within the range from about 150° to about 280° F. (corresponding to about 65° C. to about 138° C.), the β-diketone having the formula:

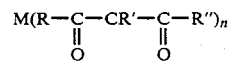

wherein M is a metal or hydrogen, n is the valence of M, R, R' and R" are selected from the group consisting of aliphatic having from eleven to eighteen carbon atoms, cycloaliphatic having from eleven to eighteen carbon atoms, and aromatic hydrocarbon, haloaromatichydrocarbon, alkoxyaromatic-hydrocarbon and alkylenedioxyaromatic hydrocarbon having from six to about eighteen carbon atoms, and from none to seven halogen atoms, and from none to two alkoxy or alkylenedioxyhydrocarbon groups, *provided*, that R' can also be hydrogen, and that only one of R and R" can be aliphatic or cycloaliphatic.

13. A process according to claim 12, in which M is hydrogen and the formula is

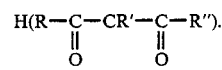

14. A process according to claim 13, in which the β-diketone is dibenzoylmethane.

15. A process according to claim 13, in which the β-diketone is stearoyl benzoyl methane.

16. A process according to claim 12, in which M is a metal and the formula is

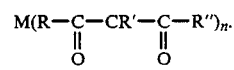

17. A process according to claim 16, in which the metal is selected from the group consisting of Li, Na, K, Mg, Ca, Sr, Ba, Zn, Al and Sb.

18. A process according to claim 12 wherein both R and R" are aromatic and R' is hydrogen.

19. A process according to claim 12 wherein R is aliphatic or cycloaliphatic, R" is aromatic and R' is hydrogen.

20. A process according to claim 12, in which the heat stabilizer is in a sufficient amount to improve the resistance of the polyvinyl chloride to deterioration in physical properties during heat processing, including discoloration, reduction in melt viscosity and embrittlement, within the range from about 0.001 to about 5% total heat stabilizers by weight of the polymer, and the β-diketone is in an amount to impart resistance to deterioration when exposed to moderate temperatures within the range from about 150° to about 215° F. (corresponding to about 65° C. to 102° C.) after heat processing, including discoloration and embrittlement, within the range from about 0.001 to about 5% β-diketone by weight of the polymer.

21. A process according to claim 12, in which the vinyl chloride polymer is polyvinyl chloride homopolymer.

22. A process accroding to claim 12, in which the vinyl chloride polymer is a copolymer of vinyl chloride and another copolymerizable monomer.

* * * * *